US010160585B2

(12) United States Patent
Frayne et al.

(10) Patent No.: US 10,160,585 B2
(45) Date of Patent: Dec. 25, 2018

(54) INFLATABLE STRUCTURE FOR PACKAGING AND ASSOCIATED APPARATUS AND METHODS

(71) Applicant: Sealed Air Corporation (US), Charlotte, NC (US)

(72) Inventors: Shawn Michael Frayne, Tampa, FL (US); Paul Chudy, New York, NY (US)

(73) Assignee: Sealed Air Corporation (US), Charlotte, NC (US)

( * ) Notice: Subject to any disclaimer, the term of this patent is extended or adjusted under 35 U.S.C. 154(b) by 58 days.

(21) Appl. No.: 14/804,081

(22) Filed: Jul. 20, 2015

(65) Prior Publication Data

US 2015/0321821 A1 Nov. 12, 2015

Related U.S. Application Data

(63) Continuation of application No. 13/109,410, filed on May 17, 2011, now Pat. No. 9,085,405, which is a
(Continued)

(51) Int. Cl.
*B65D 81/05* (2006.01)
*B65D 30/24* (2006.01)
(Continued)

(52) U.S. Cl.
CPC ......... *B65D 81/052* (2013.01); *B31D 5/0073* (2013.01); *B65D 31/14* (2013.01);
(Continued)

(58) Field of Classification Search
CPC .................................................. B65D 81/052
See application file for complete search history.

(56) References Cited

U.S. PATENT DOCUMENTS 2,799,314 A 7/1957 Dreyer et al.
3,207,420 A 9/1965 Navarrete-Kindelan
(Continued)

FOREIGN PATENT DOCUMENTS

DE 39 22 802 A1 1/1991
DE 40 07 128 A1 4/1991
(Continued)

OTHER PUBLICATIONS

Amendment filed Aug. 10, 2010 in response to Office Action dated May 10, 2010 of related U.S. Appl. No. 12/256,245.
(Continued)

*Primary Examiner* — Jason K Niesz
(74) *Attorney, Agent, or Firm* — Alston & Bird LLP

(57) ABSTRACT

An inflatable structure may be formed from a single piece of flexible film. The inflatable structure may include quilting seals which divide the inflatable chamber. The inflatable structure may include a one-way valve including an internal valve opening, a channel, and an external valve opening. A locator aperture positioned in the channel may be surrounded by a valve position-retention seal. A corresponding inflation device fills the inflatable structure with air and may do so without requiring heat sealing or insertion into the one-way valve. The inflation device may include a mechanical registration device configured to engage the locator aperture and position the one-way valve at a desired position with respect to an outlet of a source of pressurized air. The inflation device may detect when the inflatable structure is filled with a desired amount of air and automatically shut off the source of pressurized air.

13 Claims, 30 Drawing Sheets

Related U.S. Application Data continuation-in-part of application No. 12/603,280, filed on Oct. 21, 2009, now Pat. No. 9,004,758, which is a continuation-in-part of application No. 12/256,245, filed on Oct. 22, 2008, now Pat. No. 8,272,510.

(51) Int. Cl.
   *F17C 7/00* (2006.01)
   *B31D 5/00* (2017.01)
   *F16K 15/20* (2006.01)

(52) U.S. Cl.
   CPC ............ *B65D 31/147* (2013.01); *F16K 15/20* (2013.01); *F17C 7/00* (2013.01); *B31D 2205/007* (2013.01); *F17C 2221/031* (2013.01); *F17C 2250/0621* (2013.01)

(56) References Cited

U.S. PATENT DOCUMENTS

| | | | |
|---|---|---|---|
| 3,337,117 A | | 8/1967 | Lehmacher et al. |
| 4,465,188 A | | 8/1984 | Soroka et al. |
| 4,557,377 A | | 12/1985 | Maloney |
| 4,949,530 A | | 8/1990 | Pharo |
| 5,144,708 A | | 9/1992 | Pekar |
| 5,263,587 A | | 11/1993 | Elkin et al. |
| 5,308,163 A | | 5/1994 | Abe |
| 5,348,157 A | | 9/1994 | Pozzo |
| 5,351,828 A | | 10/1994 | Becker et al. |
| 5,427,830 A | | 6/1995 | Pharo |
| 5,454,642 A | | 10/1995 | De Luca |
| 5,469,966 A | | 11/1995 | Boyer |
| 5,515,975 A | | 5/1996 | Jarvis et al. |
| 5,527,012 A | | 6/1996 | Vinkel et al. |
| 5,581,983 A | | 12/1996 | Murakami |
| 5,693,163 A | | 12/1997 | Hoover et al. |
| 5,803,263 A | | 9/1998 | Pozzo |
| 5,829,492 A | | 11/1998 | Gavronsky et al. |
| 5,830,780 A | * | 11/1998 | Dennison ............ B65D 31/14 137/843 |
| 6,015,047 A | | 1/2000 | Greenland |
| 6,276,532 B1 | | 8/2001 | Sperry et al. |
| 6,311,740 B1 | | 11/2001 | Sperry et al. |
| 6,569,283 B1 | * | 5/2003 | Sperry ................ B29C 65/342 156/580 |
| 6,913,803 B2 | | 7/2005 | Peper |
| 6,978,893 B2 | | 12/2005 | Peper |
| 7,165,677 B2 | | 1/2007 | Tanaka et al. |
| 7,168,566 B2 | | 1/2007 | Anderson et al. |
| 7,168,567 B2 | | 1/2007 | Peper et al. |
| 7,201,273 B2 | | 4/2007 | Chen et al. |
| 7,228,969 B2 | | 6/2007 | Nakano |
| 7,297,387 B2 | | 11/2007 | Koyanagi |
| 7,681,734 B2 | | 3/2010 | Liao et al. |
| 7,828,146 B2 | | 11/2010 | Frayne |
| 8,272,510 B2 | | 9/2012 | Frayne et al. |
| 8,745,960 B2 | * | 6/2014 | Kannankeril ........ B31D 5/0073 53/284.7 |
| 9,004,758 B2 | | 4/2015 | Frayne et al. |
| 9,085,405 B2 | | 7/2015 | Frayne et al. |
| 2002/0108351 A1 | | 8/2002 | Sperry et al. |
| 2002/0153468 A1 | | 10/2002 | Folkmar |
| 2002/0166788 A1 | | 11/2002 | Sperry et al. |
| 2003/0108699 A1 | | 6/2003 | Tanaka |
| 2003/0109369 A1 | | 6/2003 | Lerner et al. |
| 2003/0139271 A1 | | 7/2003 | Vangedal Nielsen et al. |
| 2004/0022459 A1 | | 2/2004 | Thomasset |
| 2004/0211697 A1 | | 10/2004 | Nakano |
| 2005/0109411 A1 | | 5/2005 | Koyanagi |
| 2005/0139508 A1 | | 6/2005 | Su |
| 2005/0189257 A1 | | 9/2005 | Chen et al. |
| 2005/0236295 A1 | | 10/2005 | Perkins et al. |
| 2006/0090421 A1 | | 5/2006 | Sperry et al. |
| 2006/0191817 A1 | | 8/2006 | Nishi et al. |
| 2006/0201960 A1 | | 9/2006 | Frayne |
| 2006/0289108 A1 | * | 12/2006 | McNamara, Jr. .... B31D 5/0073 156/147 |
| 2007/0056647 A1 | | 3/2007 | Frayne |
| 2007/0065047 A1 | | 3/2007 | Kojima et al. |
| 2007/0084745 A1 | | 4/2007 | Yoshifusa |
| 2007/0090013 A1 | | 4/2007 | Yoshifusa et al. |
| 2007/0131575 A1 | | 6/2007 | Abe |
| 2007/0163916 A1 | | 7/2007 | Yoshifusa |
| 2007/0170084 A1 | | 7/2007 | Chen et al. |
| 2007/0295633 A1 | | 12/2007 | Liao et al. |
| 2008/0073238 A1 | | 3/2008 | Liao et al. |
| 2008/0280744 A1 | | 11/2008 | Tanaka et al. |
| 2009/0297068 A1 | | 12/2009 | Liao et al. |
| 2010/0096290 A1 | | 4/2010 | Frayne |
| 2010/0101970 A1 | | 4/2010 | Frayne |

FOREIGN PATENT DOCUMENTS

| | | |
|---|---|---|
| DE | 296 12 426 U1 | 10/1996 |
| EP | 255780 A2 | 2/1988 |
| EP | 2070838 A1 | 6/2009 |
| FR | 2711115 A1 | 4/1995 |
| GB | 826784 | 1/1960 |
| JP | 4-154571 A | 5/1992 |
| WO | WO 2011/002190 A2 | 1/2011 |

OTHER PUBLICATIONS

Amendments Under Article 34 and Response filed in International Application No. PCT/US2009/061598 dated Aug. 18, 2010.
Completed International Search Report and Written Opinion for Application No. PCT/US2009/061598 dated Apr. 12, 2010.
European Patent Office, Extended European Search Report for Application No. 13191652.0, dated Dec. 11, 2013, 7 pages, Germany.
Final Office Action dated Oct. 27, 2010 of related U.S. Appl. No. 12/256,245.
Free-Flow Packaging International, "Mini Pak'R® Air Cushion Machine, User Manual Revision 4.1," Copyright © 2007-2012, USA.
International Preliminary Report on Patentability for Application No. PCT/US2009/061598 dated Dec. 14, 2010.
International Search Report for PCT/US2009/061598 dated Jan. 13, 2010.
International Searching Authority, International Search Report and Written Opinion for International Application No. PCT/US2012/038025, dated Oct. 29, 2012, 18 pages, European Patent Office, The Netherlands.
Office Action (Restriction) dated Dec. 23, 2009 of related U.S. Appl. No. 12/256,245.
Office Action dated Feb. 7, 2012, for U.S. Appl. No. 12/256,245, filed Oct. 22, 2008.
Office Action dated May 10, 2010 of related U.S. Appl. No. 12/256,245.
Request for Continued Examination and Amendment filed Jan. 26, 2011 in response to Final Office Action dated Oct. 27, 2010 of related U.S. Appl. No. 12/256,245.
Sealed Air Ultipack® Automated Void Containment System, *The Ultimate Solution for Automated Void Containment*, Distributed by Sealed Air Corporation (US), Elmwood Park, NJ, Oct. 2008.
United States Patent and Trademark Office, Notice of Allowance for U.S. Appl. No. 12/256,245, dated Jul. 11, 2012, 11 pages, USA.
United States Patent and Trademark Office, Office Action for U.S. Appl. No. 12/603,280, dated Jul. 15, 2013, 12 pages, USA.
United States Patent and Trademark Office, Office Action for U.S. Appl. No. 12/603,280, dated Jan. 6, 2014, 12 pages, USA.
United States Patent and Trademark Office, Office Action for U.S. Appl. No. 12/603,280, dated Jul. 29, 2014, 12 pages, USA.
United States Patent and Trademark Office, Office Action for U.S. Appl. No. 12/603,280, dated Mar. 15, 2012, 15 pages, USA.
United States Patent and Trademark Office, Office Action for U.S. Appl. No. 12/603,280, dated Aug. 27, 2012, 13 pages, USA.
United States Patent and Trademark Office, Office Action for U.S. Appl. No. 13/109,410, dated Jun. 20, 2014, 18 pages, USA.

(56) References Cited

OTHER PUBLICATIONS

United States Patent and Trademark Office, Office Action for U.S. Appl. No. 13/109,410, dated Oct. 8, 2014, 8 pages, USA.
United States Patent and Trademark Office, Notice of Allowance for U.S. Appl. No. 13/109,410, dated Mar. 13, 2015, 8 pages, USA.
European Patent Office, Communication pursuant to Article 94(3) EPC for Application No. 13191652.0, dated Oct. 13, 2015, 4 pages, Germany.

* cited by examiner

INFLATABLE STRUCTURE FOR PACKAGING AND ASSOCIATED APPARATUS AND METHODS

CROSS-REFERENCE TO RELATED APPLICATIONS

This application is a continuation of U.S. application Ser. No. 13/109,410, filed May 17, 2011, which is a continuation-in-part of U.S. application Ser. No. 12/603,280, filed Oct. 21, 2009 and issued as U.S. Pat. No. 9,004,758, and U.S. application Ser. No. 12/256,245, filed Oct. 22, 2008 and issued as U.S. Pat. No. 8,272,510, which are hereby incorporated herein in their entirety by reference.

BACKGROUND OF THE INVENTION

1. Field of the Invention

The present invention generally relates to inflatable structures, and in particular to inflatable structures used in packaging and associated methods and apparatus.

2. Description of Related Art

Inflatable structures constitute an important part of the packaging industry. Inflatable structures are commonly used as cushions to package items, either by wrapping the items in the inflatable structures and placing the wrapped items in a shipping carton, or by simply placing one or more inflatable structures inside of a shipping carton along with an item to be shipped. The cushions protect the packaged item by absorbing impacts that might otherwise be fully transmitted to the packaged item during transit, and also restrict movement of the packaged item within the carton to further reduce the likelihood of damage to the item.

Inflatable packaging has an advantage over non-inflatable packaging in that inflatable packaging can require less raw material to manufacture it. Further, it is known within the art to make inflatable packaging such that it is inflatable on demand. Inflate-on-demand packaging allows the entity using the packaging materials to wait and inflate the packaging materials when needed, such as when shipping an item in a shipping container, as described above. This means that inflate-on-demand packaging materials occupy less space as compared to pre-inflated packaging materials, which makes them easier to store. Additionally, transportation of the packaging materials to the entity using them to package items can be less expensive than it would be if the packaging materials were already inflated because they can be shipped in significantly smaller containers.

Despite the advantages of inflate-on-demand packaging, there is still room for improvement within the art. This is because prior designs typically require the use of costly inflation devices that may be hard for the entity using the packaging materials to operate. In particular, many inflation devices heat seal the inflatable structure, which adds to the complexity and cost of such inflation devices. Further, many inflation devices also necessitate the insertion of an inflation wand into the valve of an inflatable structure, which can be difficult to accomplish, or they may also require careful machine-feeding of the uninflated packaging materials.

Accordingly, a need exists in the art for improved inflatable packaging structures and related inflation apparatus and methods that address the shortcomings of the prior art noted above.

BRIEF SUMMARY OF THE INVENTION

These and other advantages are provided by the inflatable structures presented herein, and which include an integral valve with two edge portions that may be formed from a single web of flexible film in an inline process. Such an inflatable structure and the associated apparatus and methods are capable of providing inflate-on-demand packaging that can be inflated using an inexpensive inflation device, and wherein such inflation is easy to do and does not require the use of an inflation needle, wand, or nozzle, or heat sealing by the entity using the packaging.

In particular, there is herein provided an inflatable structure for use in packaging comprising at least one flexible film defining one or more sidewalls forming an enclosed chamber and at least one one-way valve defined at least in part by the flexible film and configured to receive pressurized air to thereby inflate the enclosed chamber. The one-way valve may comprise a channel, an internal valve opening, and an external valve opening that is defined at least in part by edge portions of first and second layers of the flexible film that are formed by folding the flexible film. Further, a locator aperture may be defined in the channel.

In some embodiments the inflatable structure may further comprise a valve position-retention seal in the channel and be configured to retain the position of the one-way valve, wherein the valve position-retention seal connects the one-way valve to the sidewalls. The valve position-retention seal may surround the locator aperture. Additionally, the locator aperture may be centrally disposed with respect to the external valve opening. The inflatable structure may further comprise at least one quilting seal connecting the sidewalls defining the enclosed chamber, wherein the quilting seal defines an enclosed elongated shape with a pair of straight parallel sides and a pair of rounded ends.

An inflation device for inflating inflatable structures used in packaging is provided in an additional embodiment. The inflation device may include a holder for holding at least one inflatable structure and a source of pressurized air for inflating the inflatable structure through a valve in the inflatable structure, the source of pressurized air defining an outlet. The holder may be configured to hold the inflatable structure at a position such that insertion does not occur between the outlet of the source of pressurized air and the valve during inflation.

In some embodiments the holder may comprise a mechanical registration device configured to engage a locator aperture defined in the inflatable structure. The inflation device may further comprise a clamping mechanism configured to engage the inflatable structure. The clamping mechanism may comprise a hinge configured to provide for movement of the source of pressurized air between a loading position and an inflation position. Additionally, the clamping mechanism may further comprise a biasing mechanism configured to apply pressure to the inflatable structure. The biasing mechanism may be configured to apply pressure to an edge portion of the inflatable structure. Further, the biasing mechanism may comprise a first magnetic member and a second magnetic member.

In some embodiments the inflation device may further comprise one or more alignment tabs configured to align the inflatable structure with respect to the outlet of the source of pressurized air. Additionally, a switch may be configured to shut off the source of pressurized air when the inflatable structure is filled with a desired amount of air. The switch may comprise a pivotable arm configured to contact the inflatable structure as the inflatable structure inflates and actuate the switch to shut off the source of pressurized air when the inflatable structure is filled with the desired amount of air.

In a further embodiment, an inflation device for inflating inflatable structures used in packaging is provided. The inflation device may comprise a holder for holding at least one inflatable structure and a source of pressurized air for inflating the inflatable structure through an external valve opening of a valve in the inflatable structure, the source of pressurized air defining an outlet. The holder may be configured to hold the inflatable structure at a position such that the outlet of the source of pressurized air is spaced from at least a portion of the external valve opening during inflation.

In another embodiment, a method of inflating inflatable structures used in packaging is provided. The method may comprise holding an inflatable structure at a position such that insertion does not occur between an outlet of a source of pressurized air and a valve of the inflatable structure during inflation; and filling the inflatable structure with a desired amount of the air from the source of pressurized air.

In some embodiments holding the inflatable structure may comprise engaging a mechanical registration device with a locator aperture defined in the inflatable structure. The method may further include engaging the inflatable structure with a clamping mechanism. Additionally, engaging the inflatable structure with the clamping mechanism may comprise applying pressure to an edge portion of the inflatable structure. Also, the method may include aligning the inflatable structure with respect to the outlet of the source of pressurized air with one or more alignment tabs. Further, the method may comprise actuating a switch configured to shut off the source of pressurized air when the inflatable structure is filled with a desired amount of air. Actuating the switch may comprise contacting the inflatable structure with a pivotable arm, and actuating the switch via the pivotable arm when the inflatable structure is filled with the desired amount of air. The method may additionally include unactuating the switch when the inflatable structure that is inflated is removed and automatically inflating a second inflatable structure.

In an additional embodiment, a method of inflating inflatable structures used in packaging is provided. The method may include holding a first inflatable structure at a position such that an outlet of a source of pressurized air is proximate a valve of the first inflatable structure. Also, the method may include filling the first inflatable structure with a desired amount of the air from the source of pressurized air while preventing inflation of a second inflatable structure by blocking the air directed from the outlet from entering the second inflatable structure with an edge portion of the first inflatable structure. In some embodiments the method may further comprise removing the first inflatable structure so as to unblock the second inflatable structure and automatically inflating the second inflatable structure.

These and other aspects and features of the disclosure may be better understood with reference to the following description and accompanying drawings.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 28:
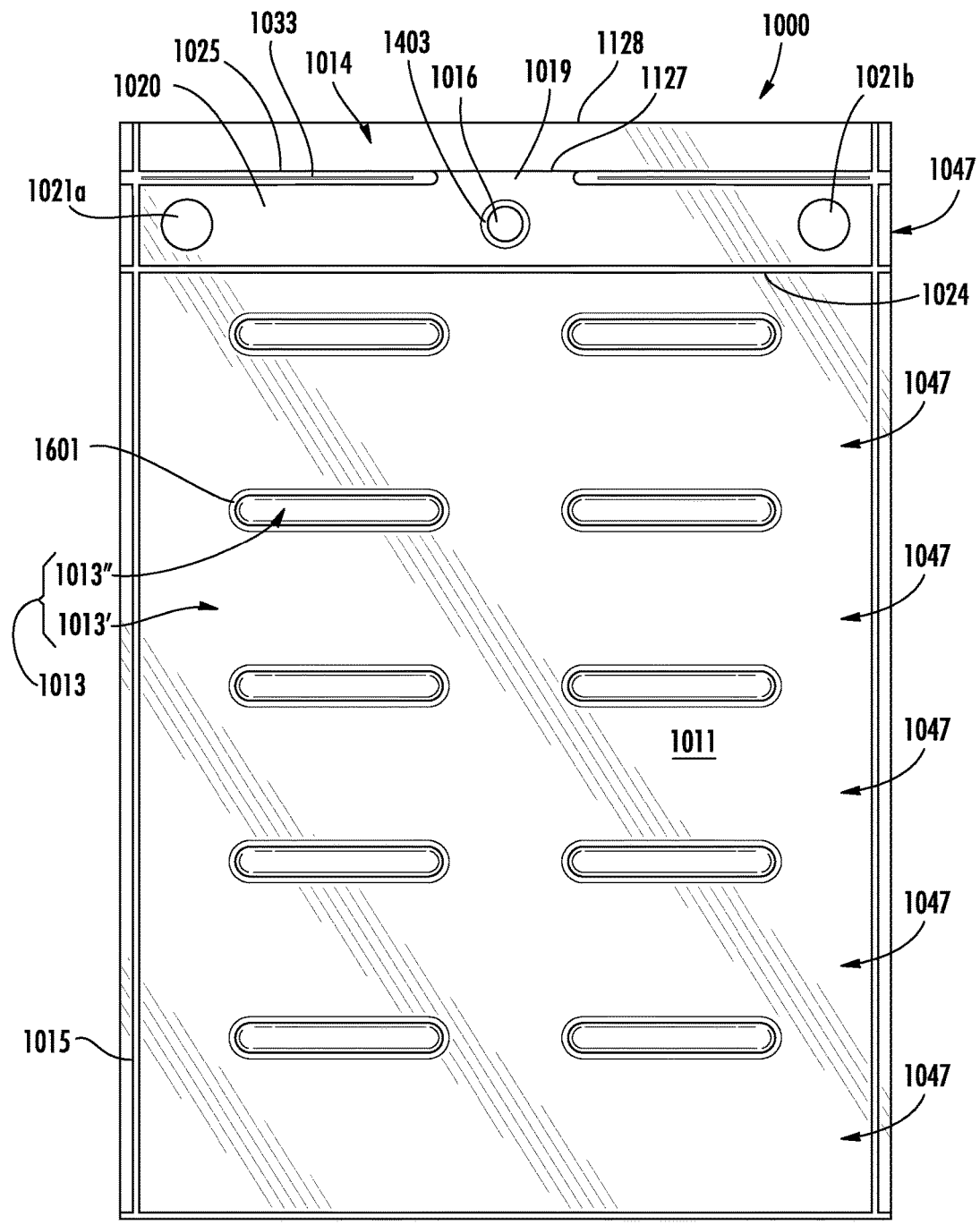
FIG. 28 illustrates a top view of an embodiment of an inflatable structure comprising a locator aperture positioned in a channel of a one-way valve and surrounded by a valve position-retention seal.
Figure 31:
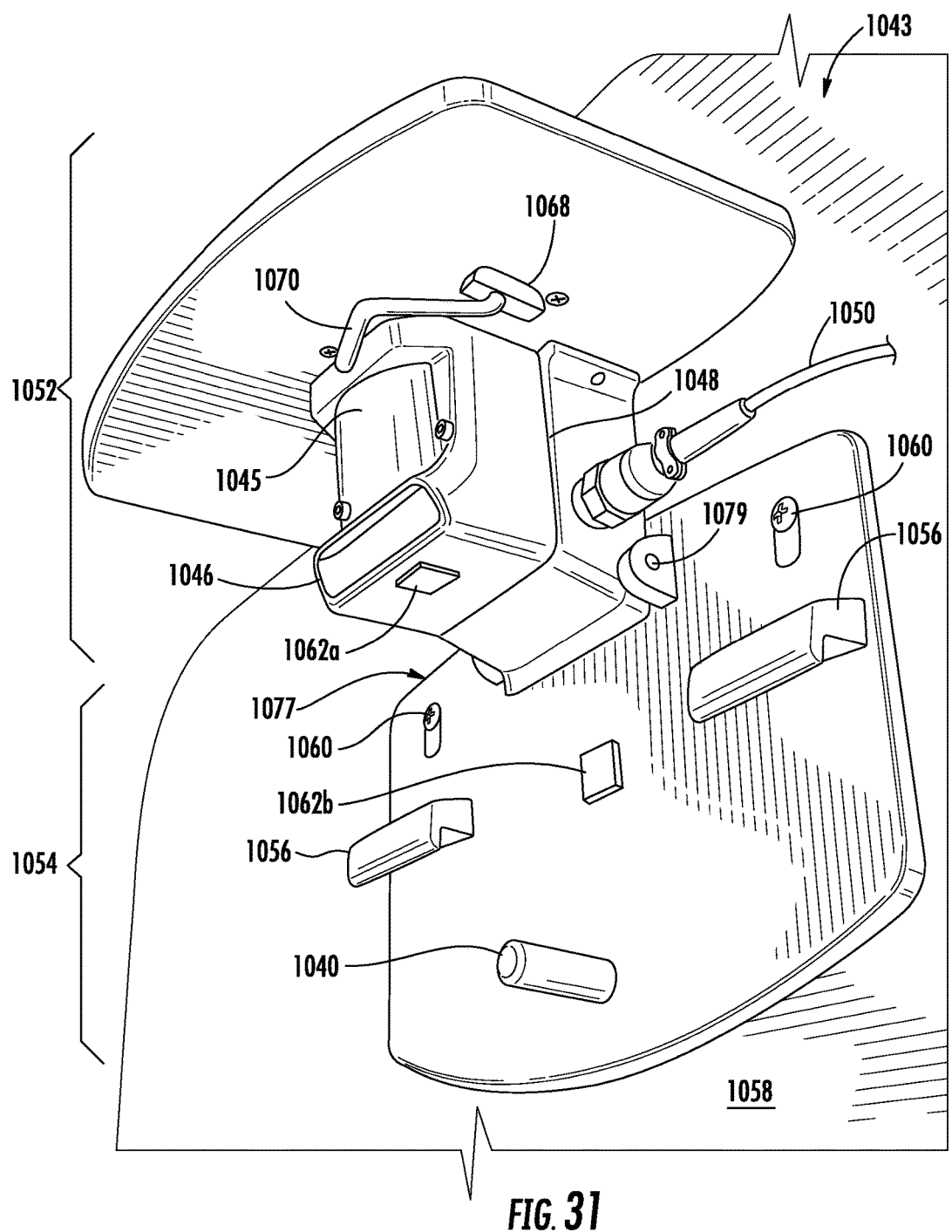
FIG. 31 illustrates a perspective view of an inflation device for inflating inflatable structures such as the inflatable structure illustrated in FIG. 28, when the inflation device is in a loading position.
Figure 33:
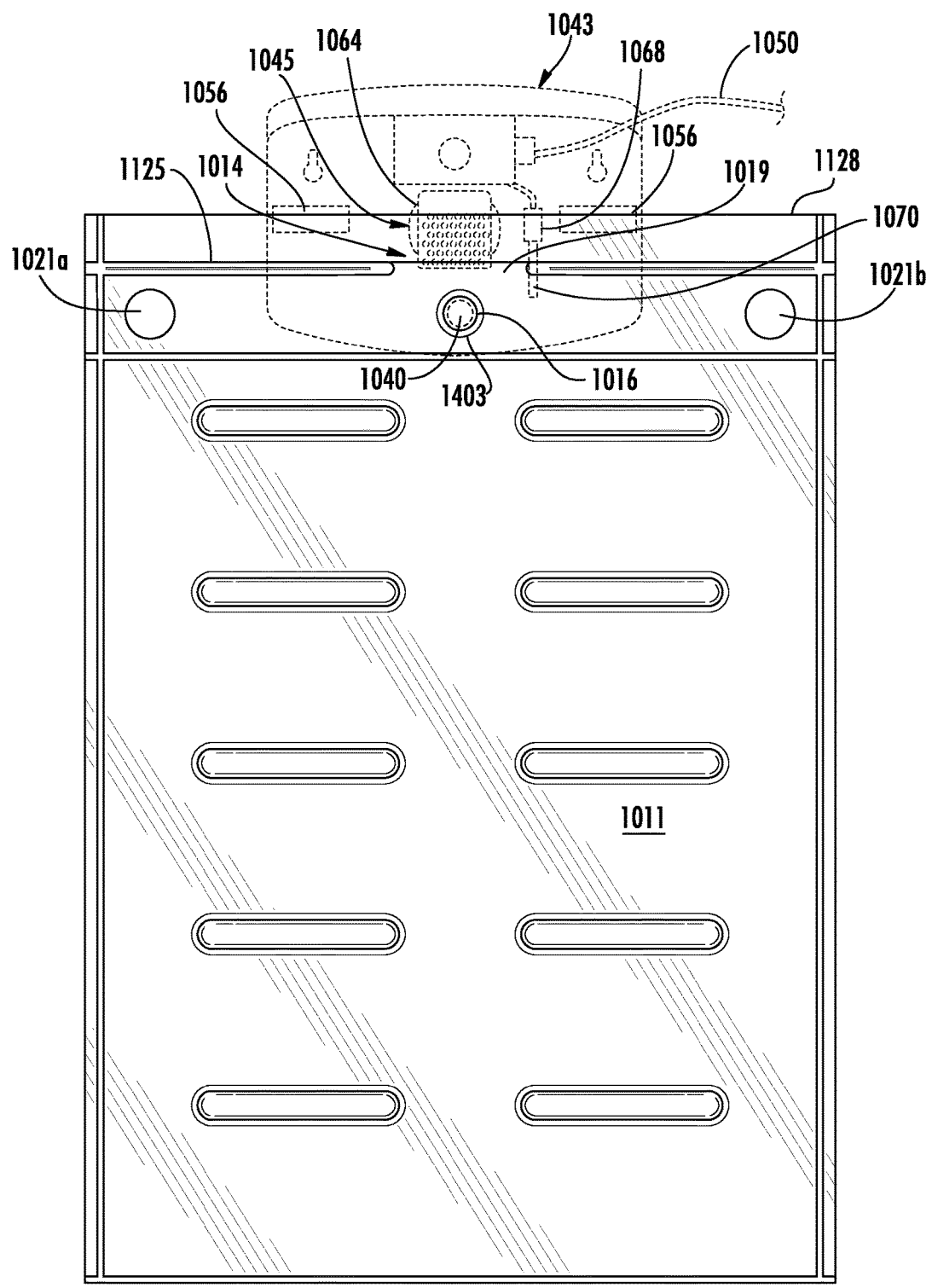

FIG. 33 schematically illustrates a top view through the inflation device of FIG. 31 with the inflation device holding the inflatable structure of FIG. 28 in the inflation position.

Figure 34:
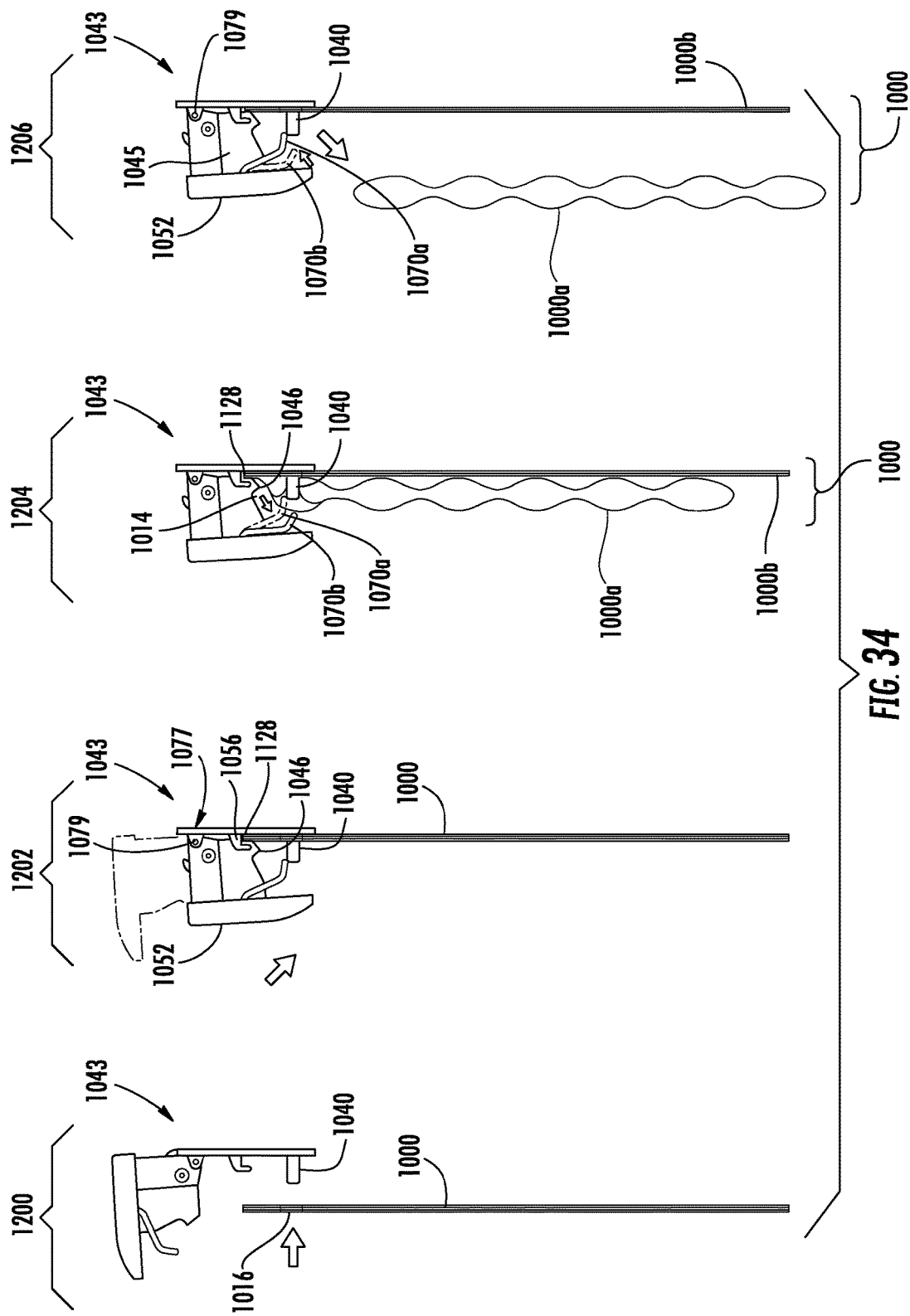

FIG. 34 illustrates a method for inflating an inflatable structure employing the inflation device of FIG. 31 to inflate the inflatable structure of FIG. 28.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
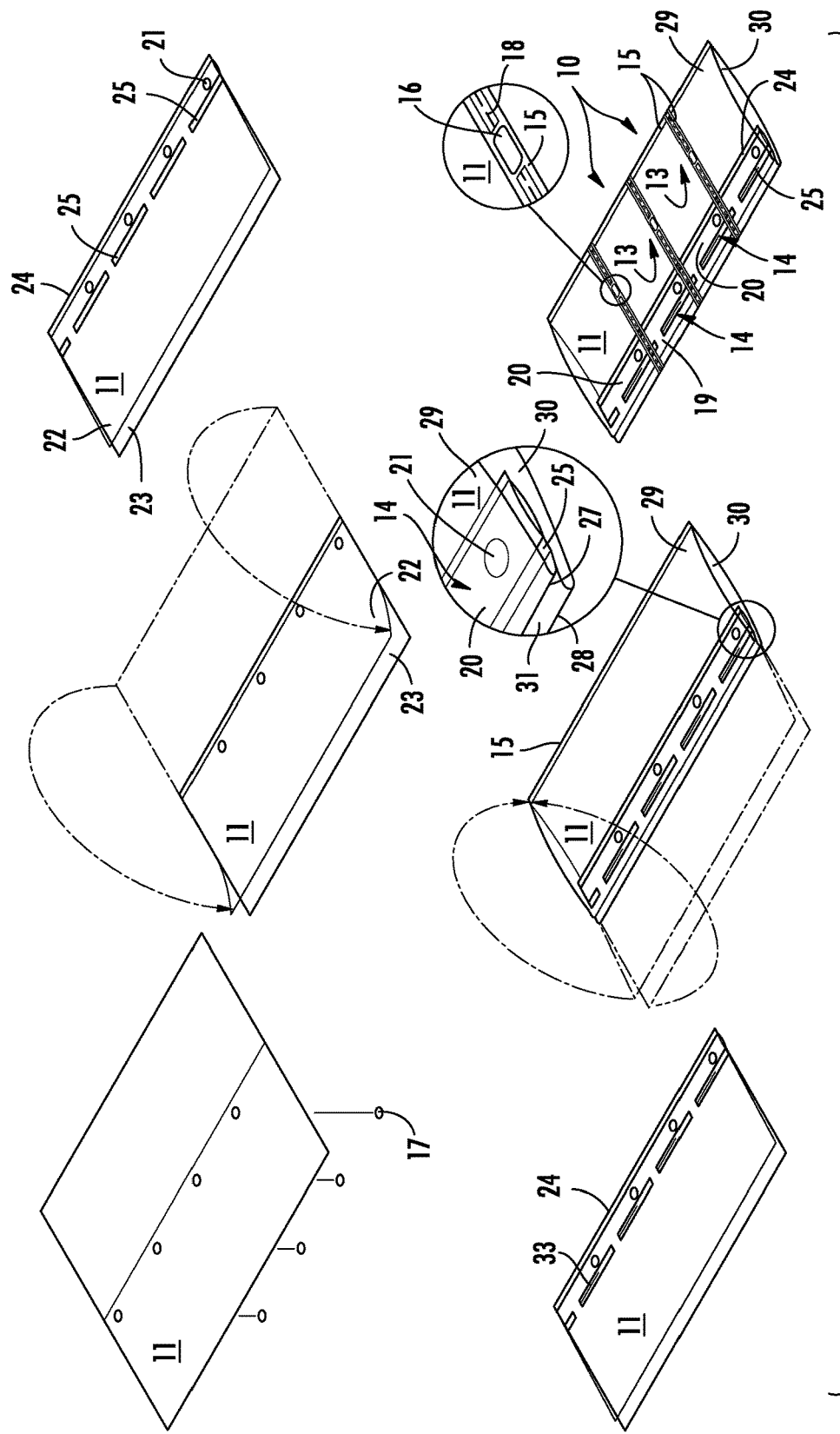
FIG. 1 is a perspective view of an embodiment of an inflatable structure with integral valve in various states of completion wherein the internal valve opening comprises a round hole and the locator aperture is rectangular in shape with rounded corners.

With reference to FIG. 1, there is provided an inflatable structure 10. In this embodiment, a single piece of flexible film 11 has been formed into multiple inflatable structures 10. The inflatable structures 10 may be formed advantageously from a unitary piece of flexible film 11 in an inline process or they may be formed from multiple pieces of flexible film. Methods of manufacturing the inflatable structures 10 will be discussed below.

As used herein, the term "flexible film" refers to a material that has the ability to change into a large variety of determinate and indeterminate shapes without damage thereto in response to the action of an applied force, and return to its general original shape when the applied force is removed. Flexible films 11 of a thickness of 1 or 2 mil can be used, although films of other thicknesses could alternatively be used. In particular, it may be possible to use flexible films 11 of even thinner thicknesses. This is because this type of inflatable structure 10 may be created in a tightly controlled manufacturing setting, such as the inline manufacturing process that will be described later. In contrast, other types of inflate-on-demand inflatable packaging typically require heat sealing in a packaging environment by the end user. In such a setting it is more difficult to control the heat sealing process, and hence thicker film may be required to allow for a margin of error.

Examples of flexible films 11 include various thermoplastic materials, e.g., polyethylene homopolymer or copolymer, polypropylene homopolymer or copolymer, etc. Non-limiting examples of suitable thermoplastic polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethyl ene/alpha-olefin copolymers. Ethylene/alpha-olefin copolymers are copolymers of ethylene with one or more comonomers selected from C3 to C20 alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other materials are also suitable such as, e.g., polypropylene homopolymer or polypropylene copolymer (e.g., propylene/ethylene copolymer), polyesters, polystyrenes, polyamides, polycarbonates, etc. The flexible film 11 may be monolayer or multilayer and can be made by any known coextrusion process by melting the component polymer(s) and extruding or coextruding them through one or more flat or annular dies. Composite, e.g., multilayered, materials may be employed to provide a variety of additional characteristics such as durability, enhanced gas-barrier functionality, etc.

Returning to the embodiment shown in FIG. 1, the inflatable structure 10 generally comprises a flexible film 11 defining an enclosed chamber 13 and a one-way valve 14 defined at least in part by the flexible film. As used herein, "one-way" is meant to describe a valve 14 that allows fluid flow in one direction, but substantially impedes it in the opposite direction. However, the valve 14 may allow for flow in both directions if, for example, an elongated object is inserted into the valve. This therefore allows for the reusability of the inflatable structures 10 herein described. With regard to the enclosed chamber 13, it substantially encloses the valve 14 within perimeter seals 15. Some of the perimeter seals 15 have locator apertures 16 between them, which exist where portions of the flexible film 11 have been removed, or a slice in the flexible film has been made. As will be described later, these assist in the filling of the inflatable structures 10 with air. Some of the perimeter seals 15 further have perforations 18 between them such that individual inflatable structures 10 may be separated from other inflatable structures. The perimeter seals 15 may take the form of a double cross seal. Use of such a double cross seal or a single wide seal prevents the inflatable structure 10 from leaking at the locator aperture 16 and the perforations 18. Thus the locator apertures 16 are "between" the perimeter seals 15 in the sense that they are surrounded on both sides by at least a portion of a perimeter seal.

Figure 2:
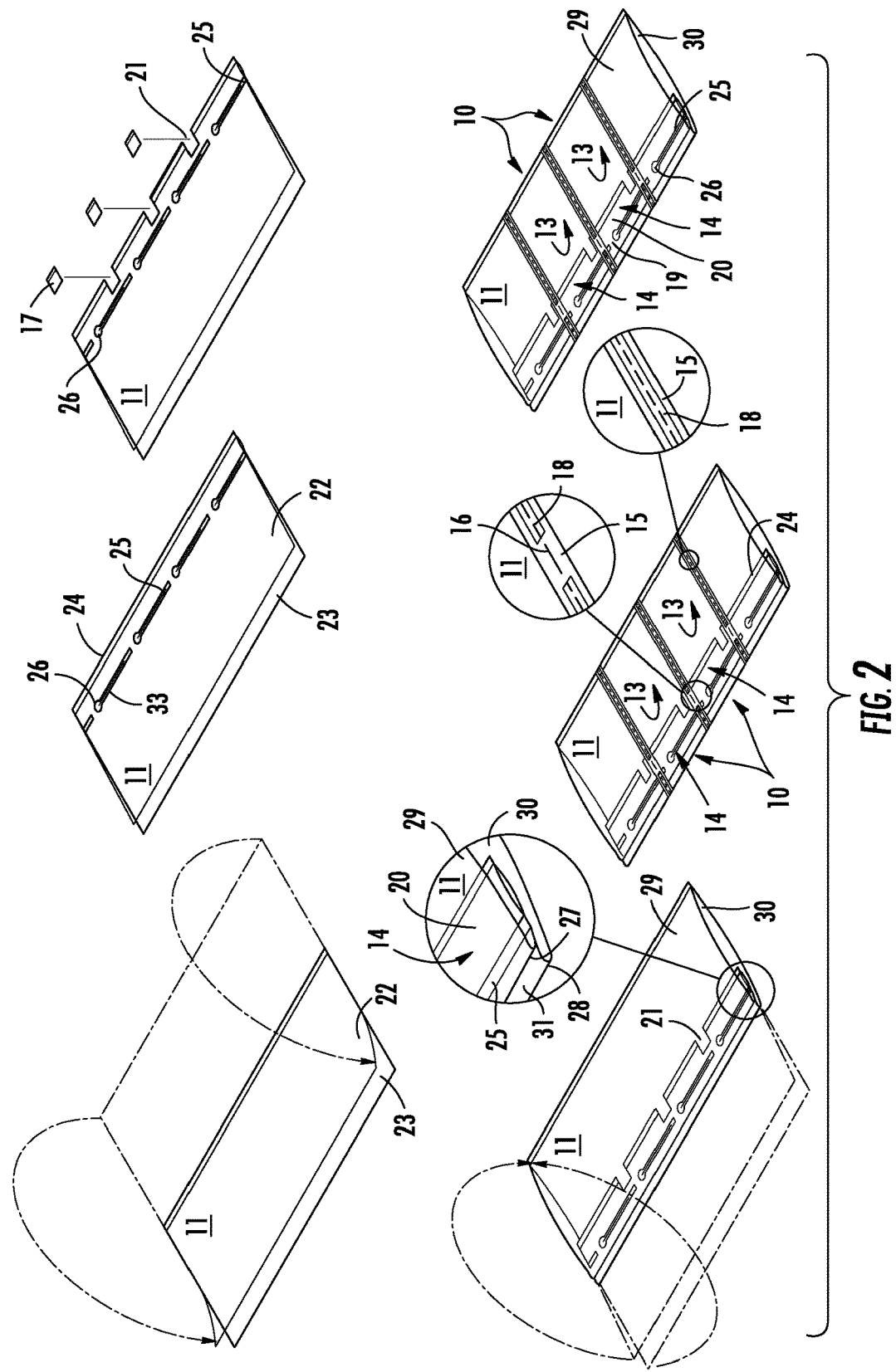
FIG. 2 is a perspective view of an embodiment of an inflatable structure with integral valve in various states of completion wherein the internal valve opening comprises a notch and the locator aperture comprises a slit.
Figure 3:
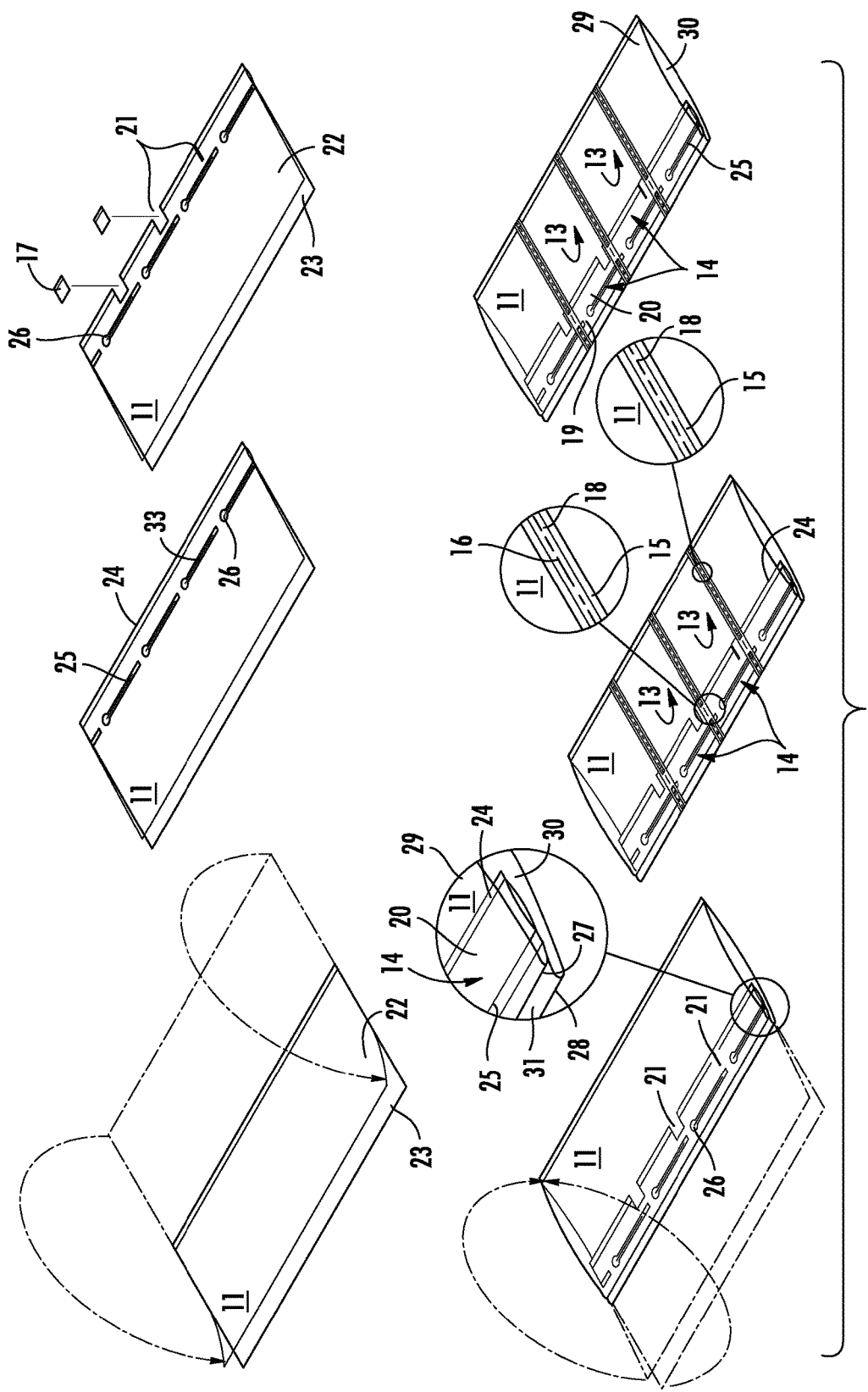
FIG. 3 is a perspective view of an embodiment of an inflatable structure with integral valve in various states of completion wherein internal valve openings comprise notches and a slit and wherein the locator aperture comprises a slit.
Figure 4:
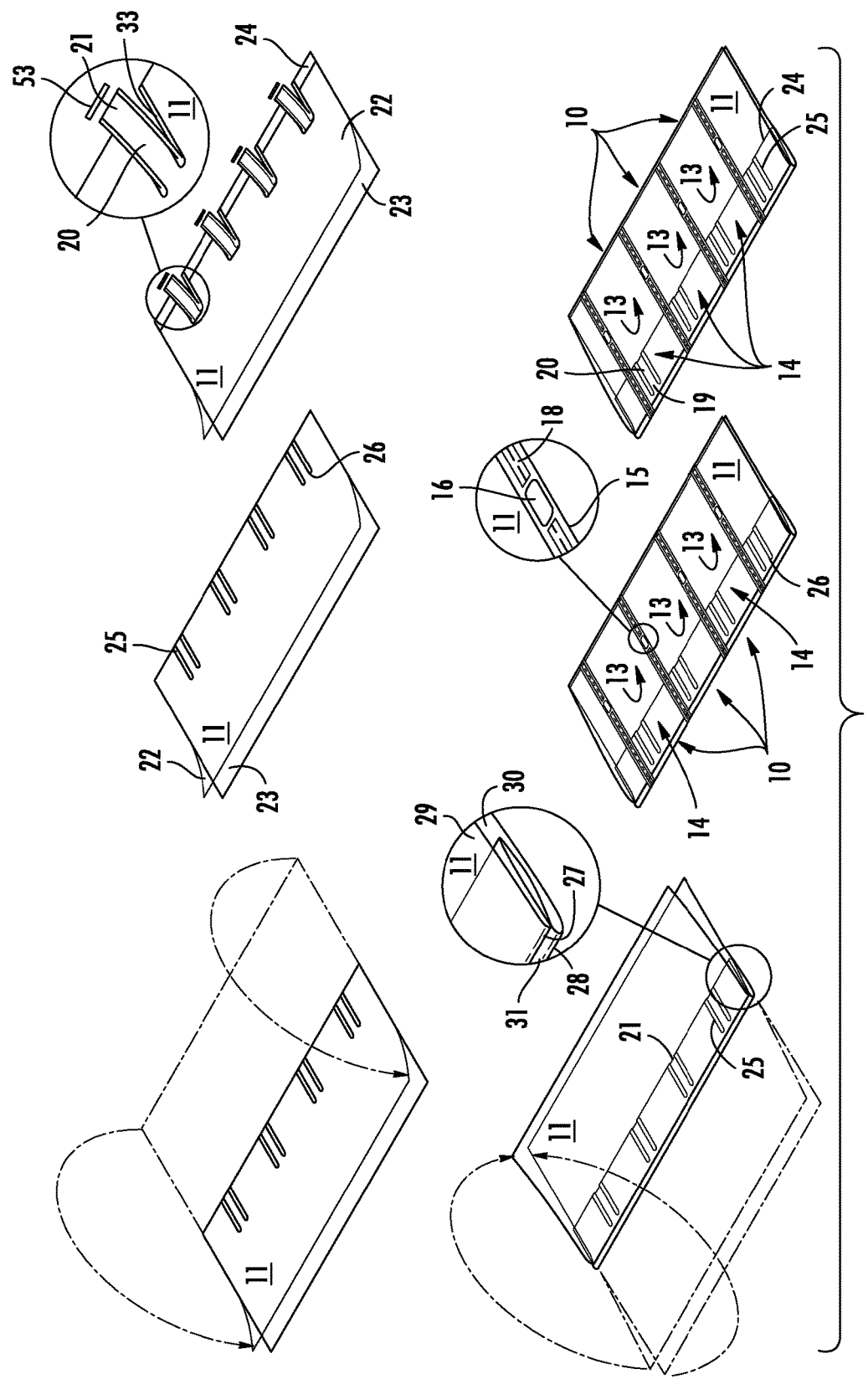
FIG. 4 is a perspective view of an embodiment of an inflatable structure with integral valve in various states of completion wherein the internal valve opening comprises a cut-off portion and wherein the seals run substantially perpendicular to the internal edge portion.
Figure 5:
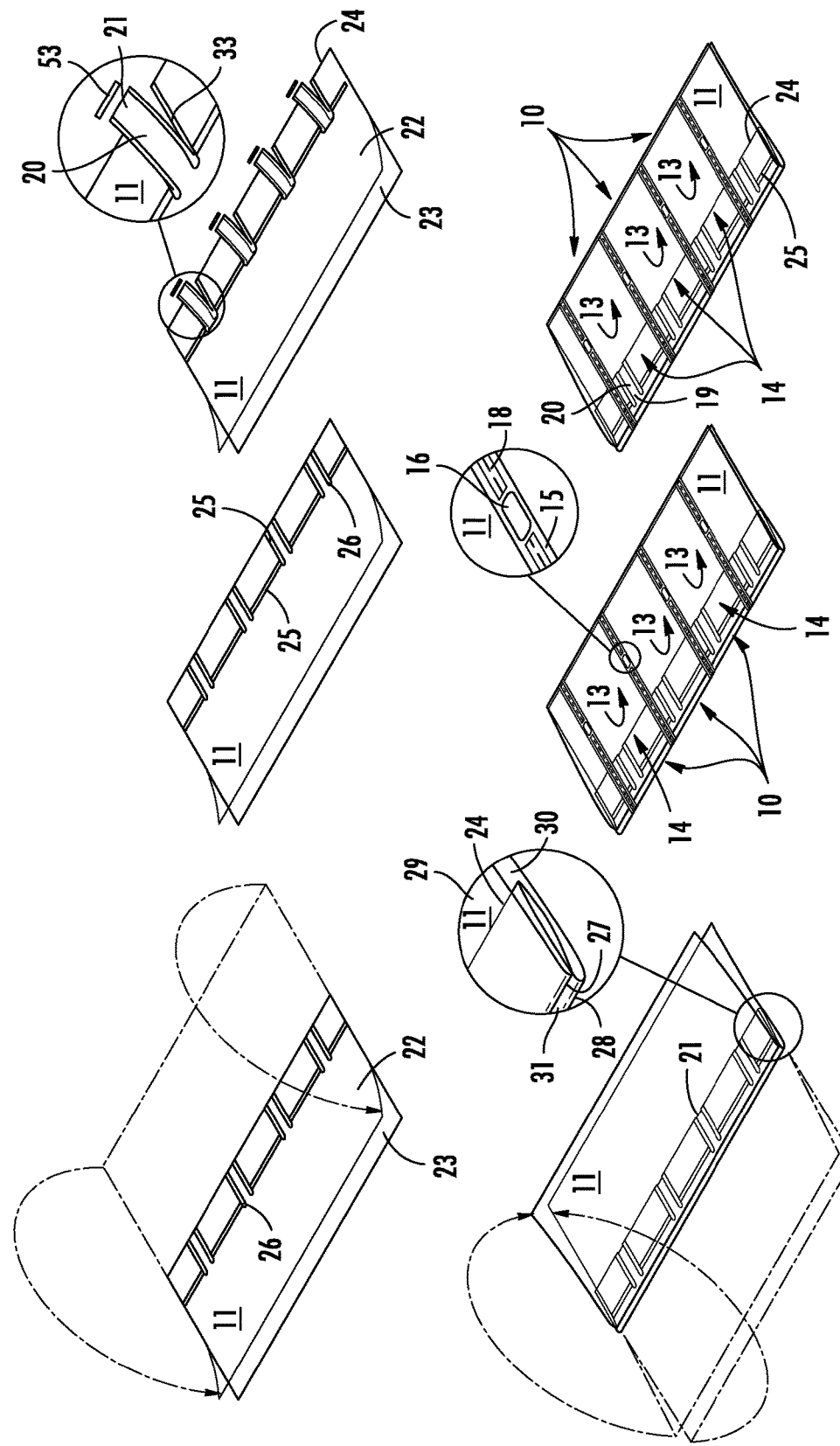
FIG. 5 is a perspective view of an embodiment of an inflatable structure with integral valve in various states of completion wherein the internal valve opening comprises a cut-off portion and wherein the seals run both substantially perpendicular to and substantially parallel with the internal edge portion.
Figure 6:
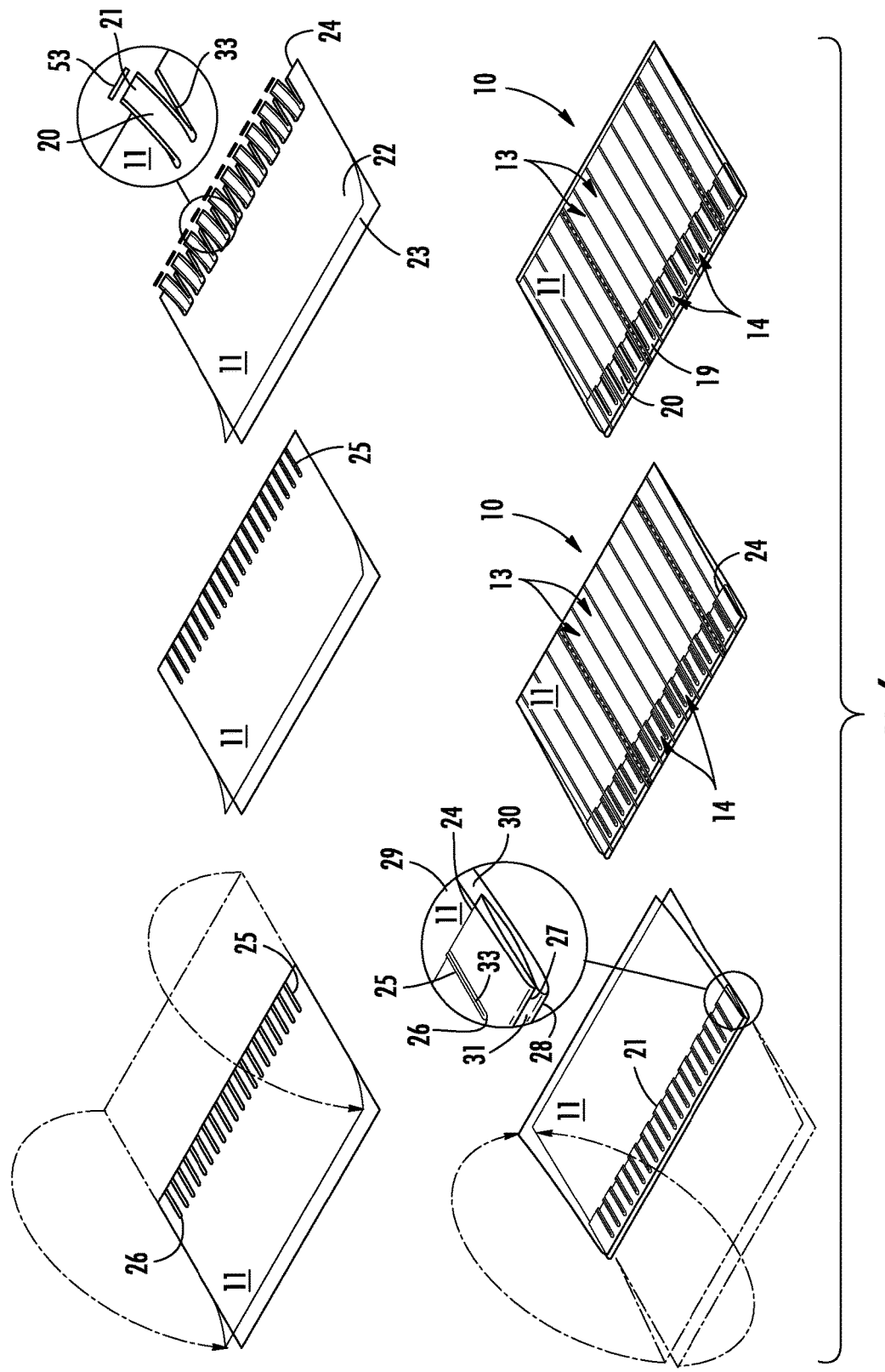
FIG. 6 is a perspective view of an embodiment of an inflatable structure with integral valve in various states of completion wherein there are multiple enclosed chambers in each inflatable structure.
Figure 7:
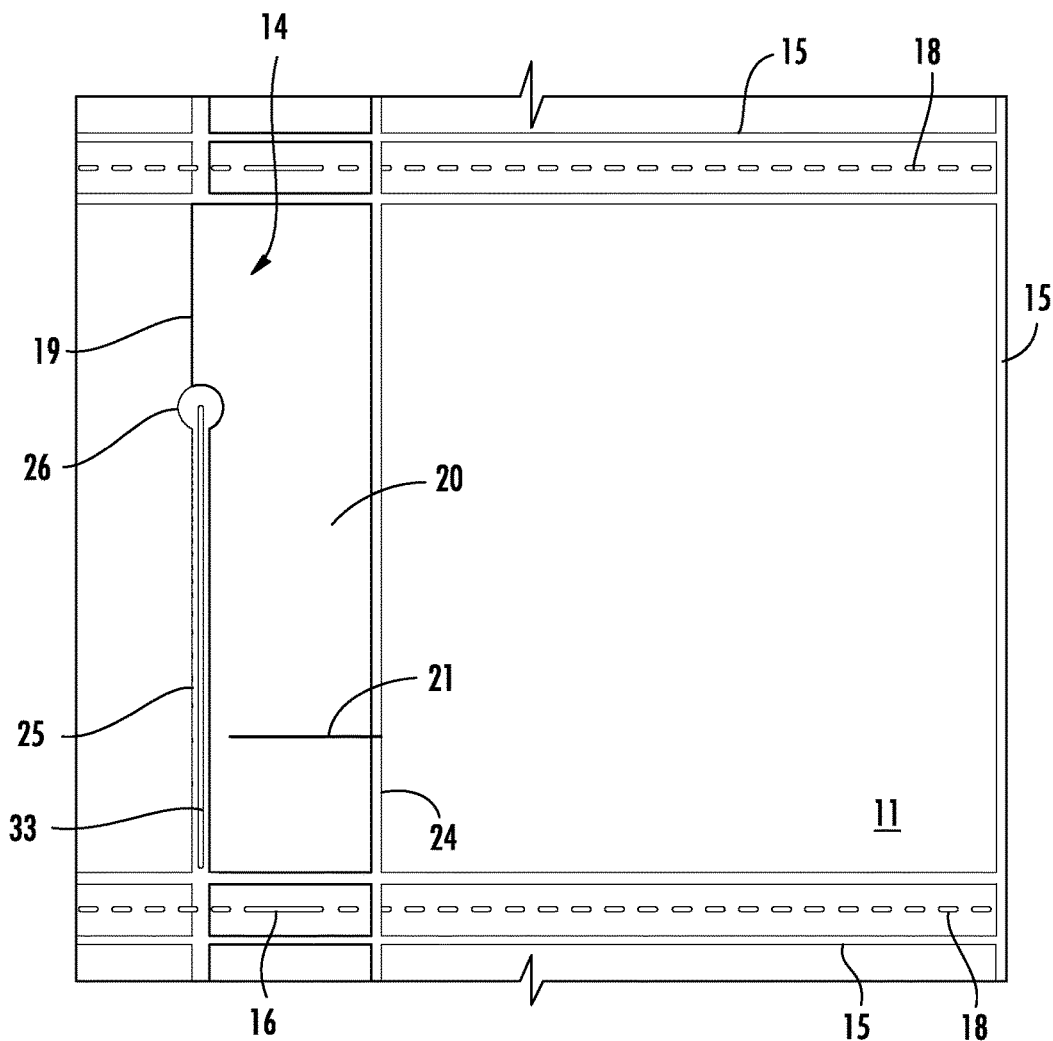
FIG. 7 is a top view of an embodiment of a completed inflatable structure with integral valve wherein the seal is rounded and the locator aperture comprises a slit.

The valve 14 itself has a number of elements. It is comprised of an external valve opening 19, which serves as an inlet, a channel 20, and an internal valve opening 21 which communicates with the enclosed chamber 13. The valve 14 is defined by a first layer 22 of flexible film 11 and an opposing second layer 23 of flexible film. The internal valve opening 21 may be comprised of a hole in the second layer 23 of the flexible film 11, as shown in FIG. 1. The internal valve opening 21 can also take a number of additional forms, such as a notch resulting from the removal of a scrap portion 17, as shown in FIGS. 2 and 3, or an edge resulting from the removal of a scrap portion 53, as shown in FIGS. 4, 5, and 6, or a slit, as shown in FIGS. 3 and 7. Thus, it can be seen that the internal valve opening 21 can be created in the first layer 22, the second layer 23, or both the first and second layers of the flexible film 11.

One side of the valve 14 is bounded by an internal edge portion 24 which can comprise a fold, a weld, or a combination of the two between the first layer 22 and the second layer 23 of the flexible film 11. The other side of the valve 14, which helps to define the channel 20, is bounded by discontinuous seals 25 between the first and second layers 22, 23. The discontinuity of the seals 25 forms an external valve opening 19 at locations where the seal does not exist. Thus, the external valve opening 19 is capable of communicating with the channel 20 and the internal valve opening 21.

The seals 25 may be formed in a variety of different ways. For example, they may run substantially parallel to the internal edge portion 24, as shown in FIGS. 1-3, 7, 8, 14, and 15, they may run substantially perpendicular to the internal edge portion, as shown in FIGS. 4 and 6, or they may run both substantially perpendicular to the internal edge portion and substantially parallel to the internal edge portion, as shown in FIG. 5. Further, the seals 25 may be rounded at a portion 26 proximate to the external valve opening 19, as shown in FIGS. 2-7 and 15. Rounding the seals 25 helps make the inflatable structures 10 more tear resistant by dispersing loads on the flexible film 11.

Additional features of the valve 14 include a pair of edge portions 27, 28. A first fold in the flexible film 11 results in the formation of first edge portion 27 and a sidewall 29 of the flexible film. A second fold in the flexible film 11 results in the formation of a second edge portion 28 and an additional sidewall 30 of the flexible film. The two sidewalls 29, 30 of the flexible film 11 then substantially envelop the valve 14 and form the enclosed chamber 13 by sealing together at least the two sidewalls with perimeter seals 15. The perimeter seals 15 may also seal together the first and second layers 22, 23 of the flexible film 11 to close off the valve 14 and prevent it from communicating with the valves of neighboring inflatable structures 10. Additionally, the second edge portion 28 can be offset from the first edge portion 27 in a planar direction defined by the inflatable structure 10. As most easily seen in FIG. 8, this arrangement creates a gutter 31 between the first and second edge portions 27, 28 which aids in filling the inflatable structure 10 with air. In particular, air flow 32 directed in a direction perpendicular to the planar direction or the inflatable structure will be deflected into the valve 14 by the edge portion extending further outwardly from the valve (e.g. edge portion 28 in FIG. 1).

Another feature that may be present in the valve is slits 33, which may be provided along the midline of the seals 25. The slits 33 function to separate the valve 14 from the rest of the inflatable structure 10 to some degree, and therefore help to prevent accidental discharge of the air from the enclosed chamber 13 of a filled inflatable structure when it is vibrated or otherwise disturbed.

An additional embodiment of the inflatable structure 10 is shown in FIG. 6. This embodiment is similar to the other previously described embodiments, but differs in that it uses multiple enclosed chambers 13 with corresponding valves 14. In other words, instead of having one valve 14 and one enclosed chamber 13 per inflatable structure 10, there are multiple valves and multiple enclosed chambers per inflatable structure. This is accomplished by using a narrower enclosed chamber 13 as well as perimeter seals 15 which do not extend between every enclosed chamber. This embodiment is configured to be used in wrapping items for shipment.

Figure 8:
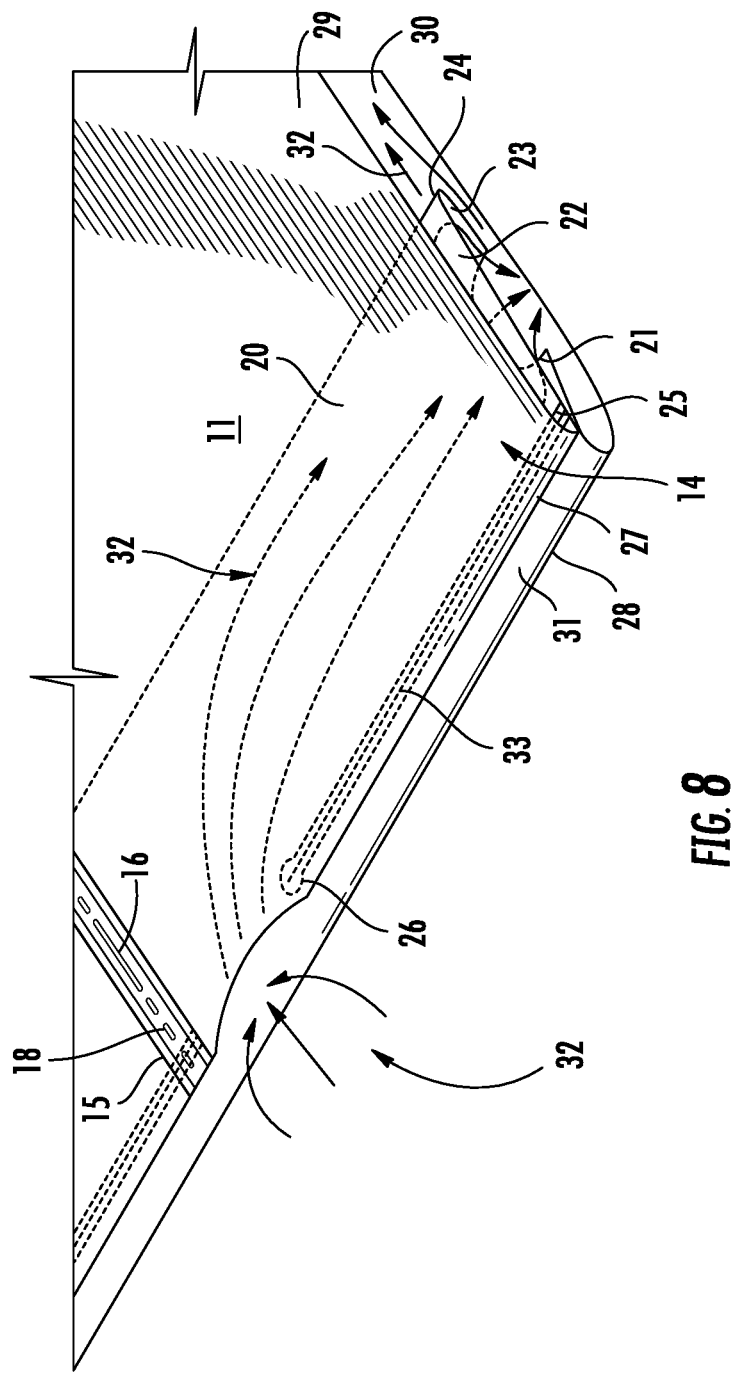
FIG. 8 is a cutaway view showing the inner portions of an embodiment of an inflatable structure and the air flow that occurs through the inflatable structure during inflation wherein the internal valve opening comprises a round hole.

The inflatable structures 10 discussed above are capable of inflation-at-a-distance. This means that the structure of the valve 14 allows air flow 32 to temporarily open the valve without necessitating contact between the inflatable structure 10 and any inflation wand, needle, nozzle, or other similar structure. Inflation-at-a-distance is depicted in FIG. 8 wherein the valve 14 is shown being opened by the air flow 32. Once the air flow 32 has ceased, or the valve 14 is moved out of the proximity of the air flow, the first and second layers 22, 23 of flexible film 11 seal together, which keeps the air sealed in the enclosed chamber 13.

After inflation and use, the inflatable structures 10 may be disposed of, reused, or recycled. When disposing of used inflatable structures 10, the volume of the inflatable structures may be reduced dramatically by either rupturing the inflatable structures or by releasing the air from each inflatable structure via the valve 14. If an elongated object, such as a pen or straw is inserted into the valve 14, the seal created by the valve can be temporarily broken. This action will lead to the release of air from the inflatable structure 10, thereby deflating it. Reuse of the inflatable structures 10 is relatively simple in that the inflatable structures can be re-inflated without necessitating the use of an inflation needle, as a person may simply blow towards the external valve opening 19 of the valve 14 to refill it.

Having described the features of the inflatable structures 10, methods of forming the inflatable structures will now be described. It is to be recognized that it is possible to form the claimed inflatable structures 10 in a number of ways. The following descriptions are meant only to provide examples of possible methods of forming the inflatable structures 10. In particular, the order of operations could be changed. Further, the particular manner of carrying out an operation could also be changed. However, it is of note that the manufacturing process may not require handwork for assembly. In contrast to many other types of inflatable packaging, the inflatable structures 10 can be created in an inline manufacturing process without requiring handwork, which greatly reduces production costs and production times.

Figure 9:
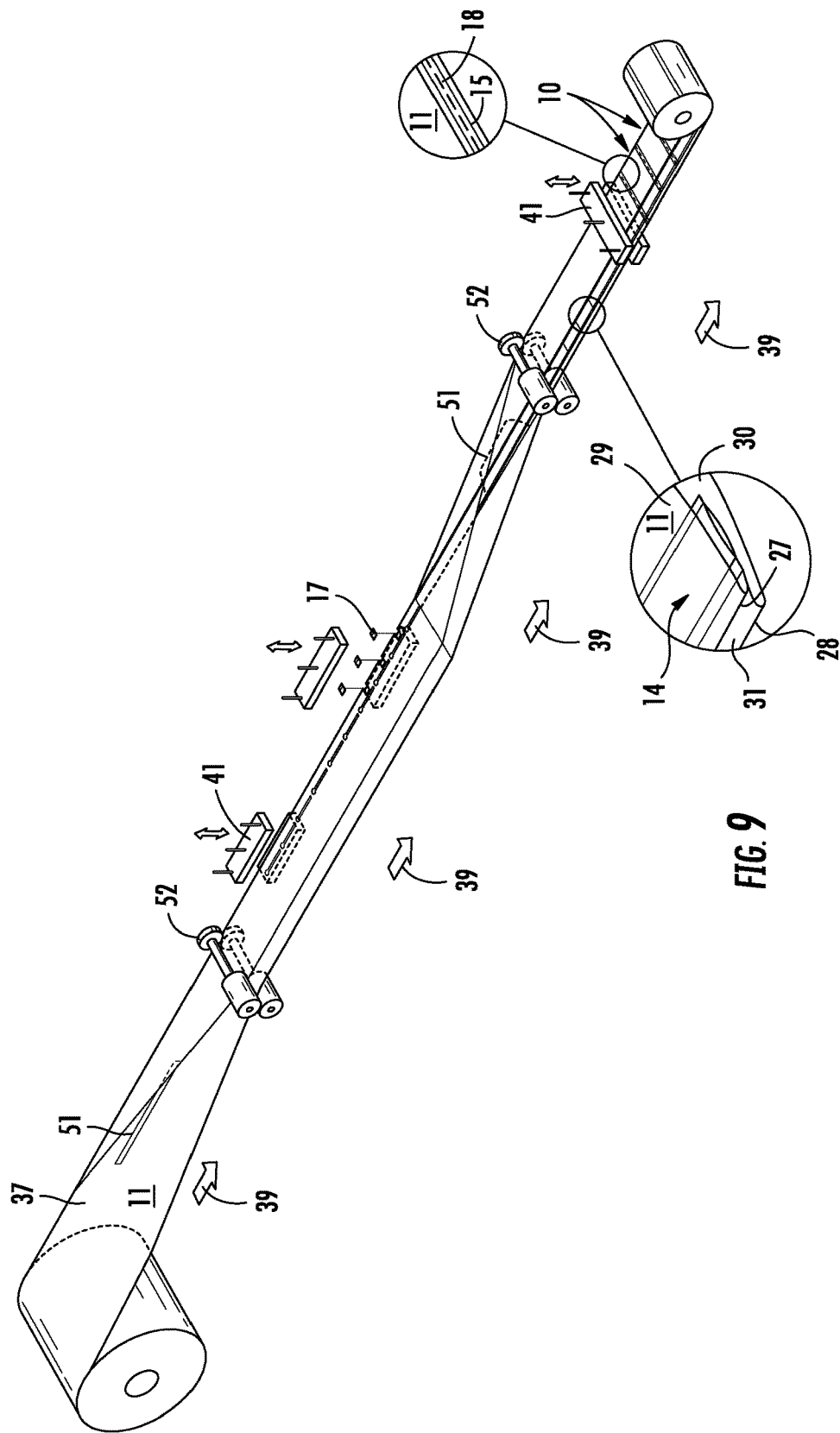
FIG. 9 is a perspective view of an embodiment of an inflatable structure inline manufacturing process.

One such method of forming an inflatable structure 10, as shown in FIG. 9 comprises advancing a continuous web 37 of flexible film 11 in a machine direction 39 and folding the flexible film in a direction perpendicular to the machine direction to create the internal edge portion 24. Such a fold may be created by using a folding plow 51. The internal edge portion 24 can alternatively be formed by sealing together two layers 22, 23 of flexible film 11, or by both folding and sealing together two layers of flexible film. Such a seal can be created using a rolling sealer 52. An additional step is to seal the first layer 22 of flexible film 11 and the second layer 23 of flexible film together to create seals 25 that define the valve 14. The internal valve opening 21 may be created by forming an aperture in either or both of the first and second layers 22, 23 of the flexible film 11 proximate to the internal edge portion 24. As previously discussed, this can comprise slicing a slit in the flexible film 11, punching out a hole or cutting off a scrap portion 17 to create a notch, or slicing off a scrap portion 53 of flexible film. Another step is to fold the first layer 22 of flexible film 11 and the second layer 23 of flexible film in directions substantially perpendicular to the machine direction 39 to create the first edge portion 27 and the first sidewall 29 of the enclosed chamber 13. Also, the second layer 23 of flexible film 11 is folded in a direction substantially perpendicular to the machine direction 39 to create the second edge portion 28 and the second sidewall 30 of the enclosed chamber 13. Folding plows 51 can be used to create these folds.

Further, the sidewalls 29, 30 may be sealed together to create perimeter seals 15 that form the enclosed chamber 13. A rolling sealer 52 and a sealing bar 41 may be used to create the perimeter seals 15. It is to be understood that the perimeter seals 15 do not have to be placed at the edges of the layers 22, 23 of the flexible film 11. Rather, "perimeter" is meant to describe the perimeter seals' function as to define bounds of the enclosed chamber 13. The perimeter seals 15 can be placed near the edges of the two sidewalls 29, 30 and they can also extend between what will then become two separate inflatable structures 10. The perimeter seals 15 may also seal together the first and second layers 22, 23 of the flexible film 11 so as to prevent the valve 14 from communicating with the valves of neighboring inflatable structures 10.

The perimeter seals 15 may further be perforated so as to allow for the separation of the inflatable structures 10 from one another. Also, locator apertures 16 may extend between the perimeter seals 15 so as to allow for engagement with a mechanical registration device 40, as will be described later. With regard to the location of the perforations 18 and locator apertures 16, they may extend directly through the sealed portion of the flexible film 11, or they may extend between two adjacent seals when, for example, the perimeter seals 15 comprise a double cross seal. Both such arrangements keep the perforations 18 and locator apertures 16 from piercing the enclosed chamber 13, which would inhibit the ability of the inflatable structure 10 to maintain an inflated state.

With regard to the seals 25 and perimeter seals 15, such terminology is meant to broadly cover various types of sealing arrangements. For example, they can include welds created by heat sealing or use of adhesive or cohesive bonds. It should then be understood that while specific terms have been applied to describe such joining arrangements, the terms are used in a generic and descriptive sense only, and not for the purposes of limitation.

With further regard to the seals 25 in particular, they may be discontinuous, as discussed above. Discontinuous seals 25 herein refer to seals that have breaks where the first layer 22 and second layer 23 of the flexible film 11 are not sealed to one another. The discontinuity may be the result of using a heat weld with portions of the first layer 22 of flexible film 11 and the second layer 23 of flexible film having a heat-resistant substance 34, such as heat resistant ink, between them. This results in the creation of the external valve opening 19 at the discontinuity. It is of note, however, that the channel 20 of the valve 14 itself may be formed without the use of heat-resistant ink. This is beneficial since most heat-resistant inks develop a small amount of tackiness when heat is applied. This tack is usually not an issue when inflatable structures 10 with more conventional valves are concerned, since a rigid structure such as an inflation needle is typically used to force open the valve channel prior to inflation. However, when performing inflation at a distance, air pressure opens the valve channel 20. Therefore, in order to reduce the air pressure needed to accomplish this, any potential source of tack should be reduced.

This is accomplished in the present valve 14, which does not require heat resistant ink in the channel 20 of the valve. In particular, the machine seal 25 of the present invention can be made in a discontinuous manner by using a heated roller with gaps in the sealing surface corresponding to the discontinuities. A heated sealing bar 41 with gaps in the sealing surface corresponding to the discontinuities could also be used, or a sealing bar without gaps in the sealing surface could be used in conjunction with another type of heat resistance substance such as pieces of TEFLON® placed at each discontinuity. Alternatively, a heated sealing bar 41 without gaps could be used, in combination with an intermittent advance of the flexible film 11 which may be accomplished by a variety of known means such as by application of a dancer bar, to allow for a discontinuous seal 25.

Further, the seals 25 may have a rounded portion 26, as previously discussed, which helps to prevent tears of the flexible film 11. This can be created by spot sealing the first layer 22 of the flexible film 11 to the second layer 23 of the flexible film proximate to the end of a seal 25. Also, an additional step can include slicing a slit 33 into the seals 25. As previously discussed, this helps to keep the valve 14 from accidentally opening.

Figure 14:
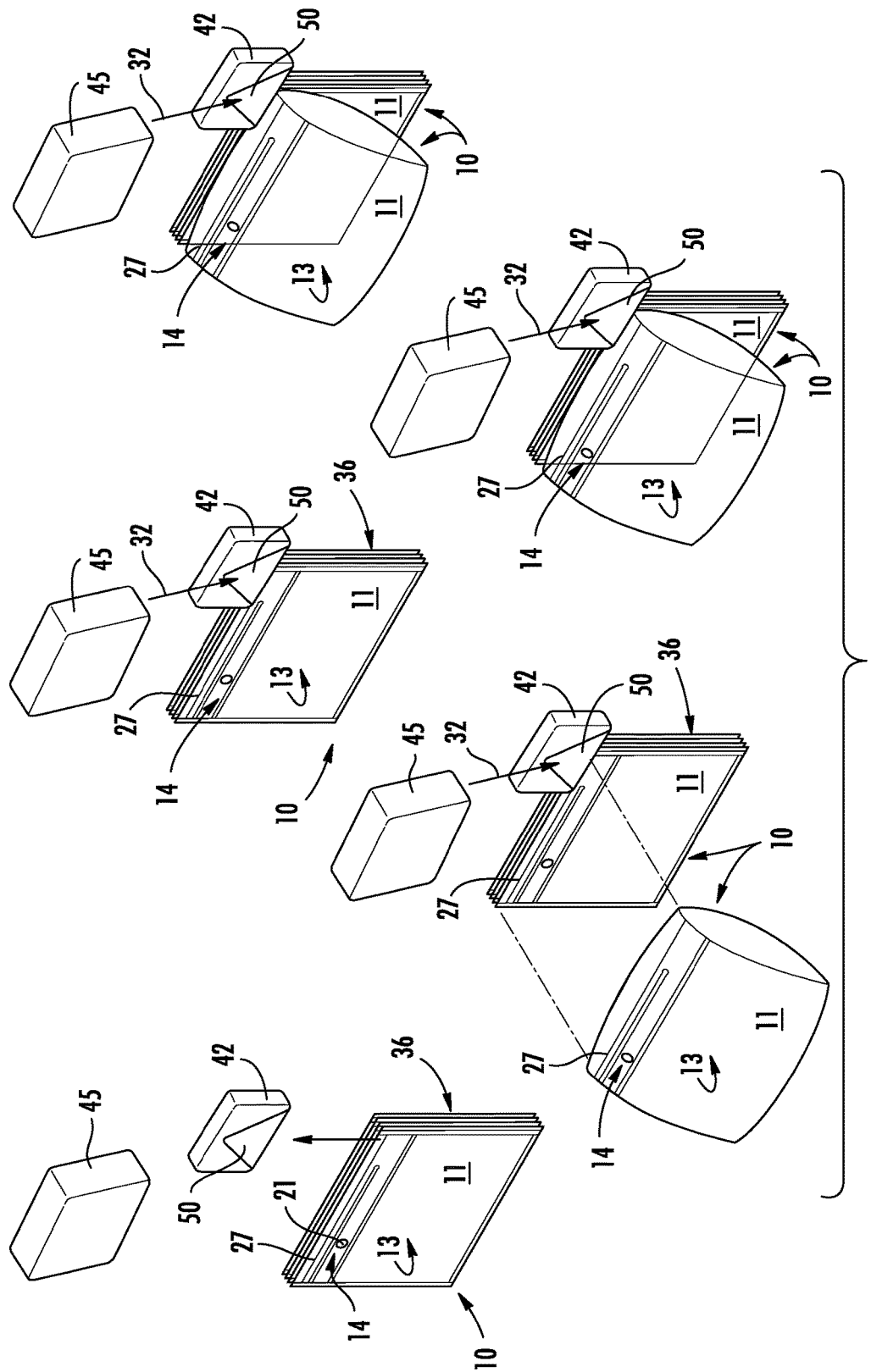
FIG. 14 is a perspective view of an embodiment of a cartridge-based inflatable structure inflation device in operation wherein the holder comprises a clamp.
Figure 15:
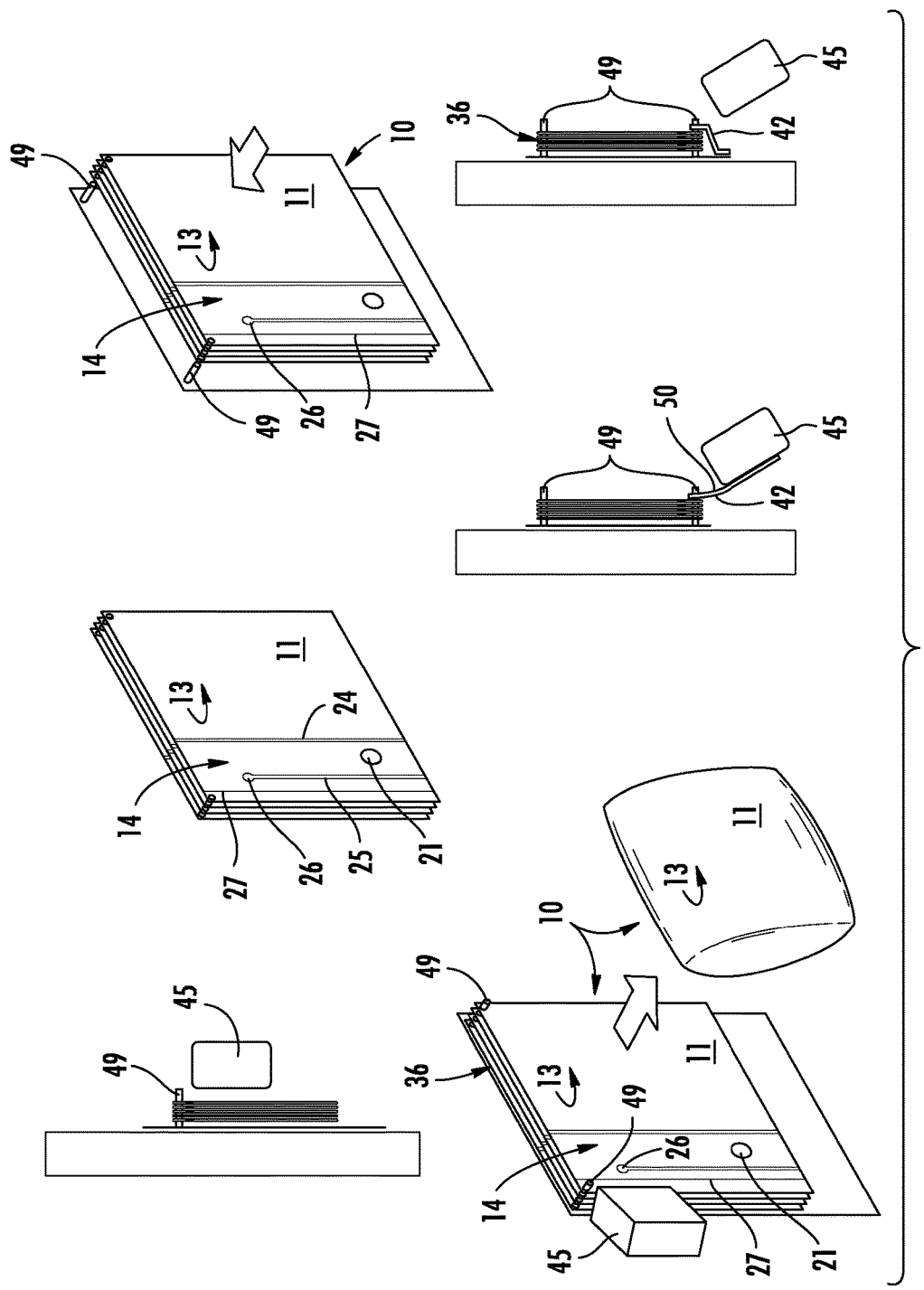
FIG. 15 is a perspective view of an embodiment of a cartridge-based inflatable structure inflation device in operation wherein the holder comprises pins.
Figure 16:
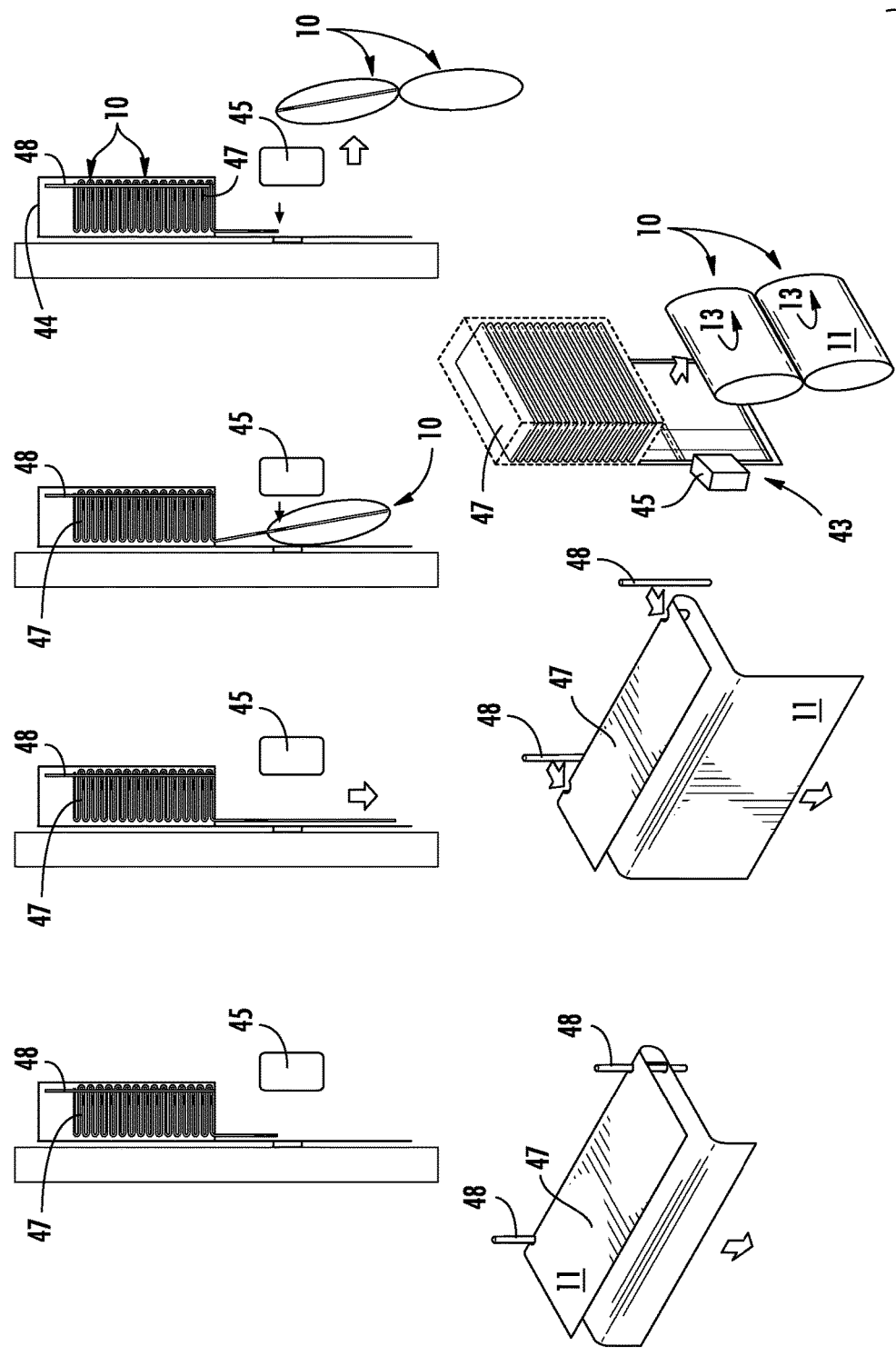
FIG. 16 is a perspective view of an embodiment of a fold-based inflatable structure inflation device in operation.

The finished product from the above described process may take the form of a continuous web of inflatable structures 10. Such a continuous web may then be packaged in a number of different manners so as to be ready for use. One such manner is to roll the continuous web into a roll 38, as shown in FIGS. 10-13. Another way to package the inflatable structures 10 is to fold them into a folded form 47, as shown in FIG. 16. Alternately, the continuous web may be cut into individual inflatable structures 10, and then connected together in the form of a cartridge 36, as shown in FIGS. 14, and 15. In one such embodiment, the second edge portion 28 of an inflatable structure 10 may be attached to the second edge portion of additional inflatable structures, as shown in FIGS. 14 and 15. Such cartridges 36 can be held together by a holder 42, which can take the form of a clamp, staple, rod, etc. If a holder 42 such as a staple is used, the holder can extend through a portion of the inflatable structure 10 other than the sidewalls 29, 30 so as to not puncture the enclosed chamber 13.

It is of note that these methods of inflatable structure 10 manufacturing may not require hole-alignment between different webs of flexible film 11. Elimination of this step is advantageous in that this is otherwise a difficult step in high-speed manufacturing.

An inflatable structure 10 inflation device 43 will now be discussed. With reference to FIGS. 10-13, there is pictured an embodiment of an inflation device 43. The inflation device 43 is comprised of a housing 44, an inflatable structure holder 42, and a source of pressurized air 45 with an outlet 46. The inflatable structure 10 inflation device 43 of this embodiment is designed to dispense a continuous web of inflatable structures, shown in FIGS. 10-13 as a roll 38 of inflatable structures. Other forms of webs of inflatable structures 10 could also be inflated such as a folded form 47 of the inflatable structures as shown in FIG. 16.

Figure 10:
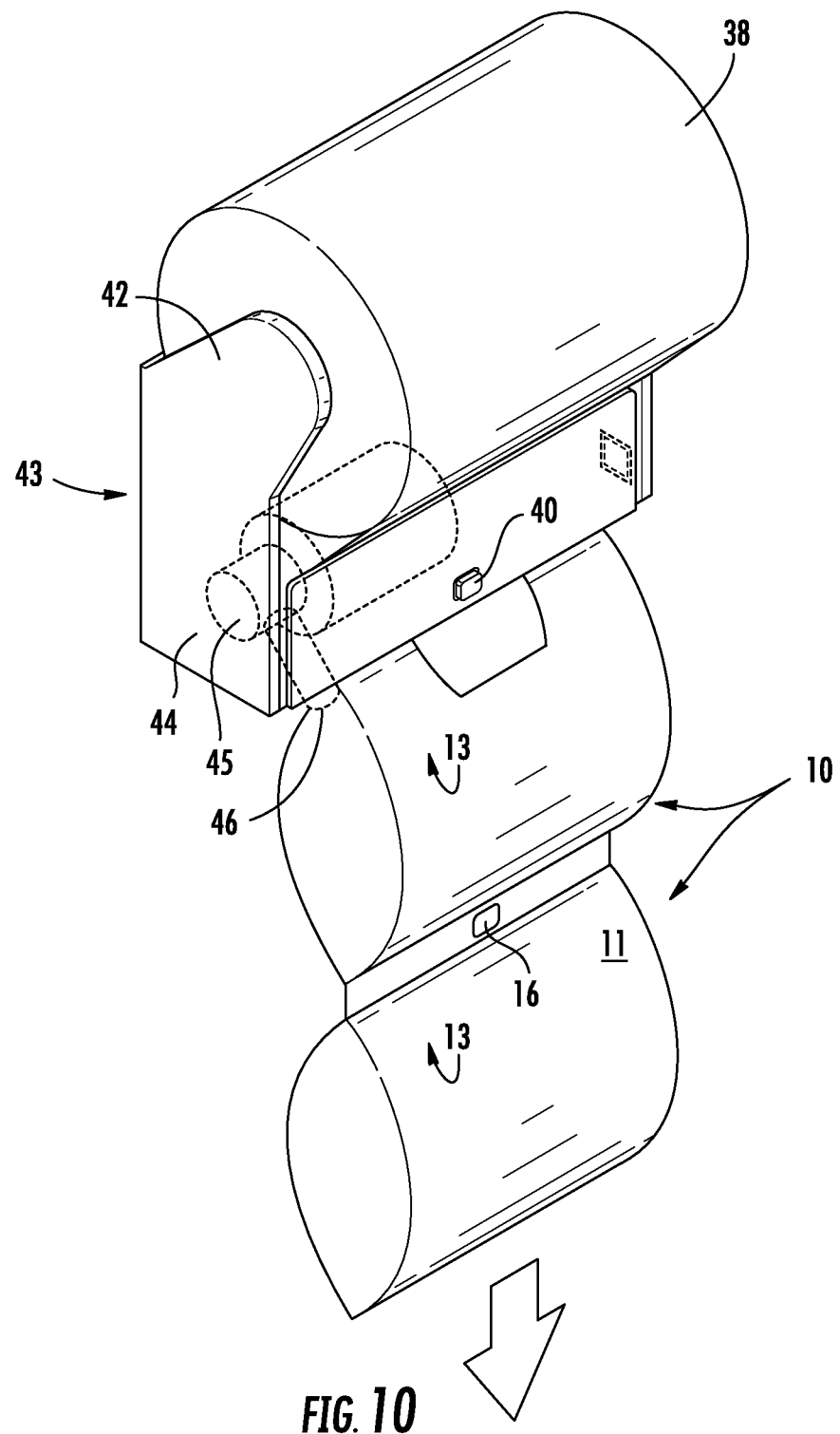
FIG. 10 is a perspective view of an embodiment of an inflatable structure inflation device with mechanical registration device for use with a roll of inflatable structures.
Figure 13:
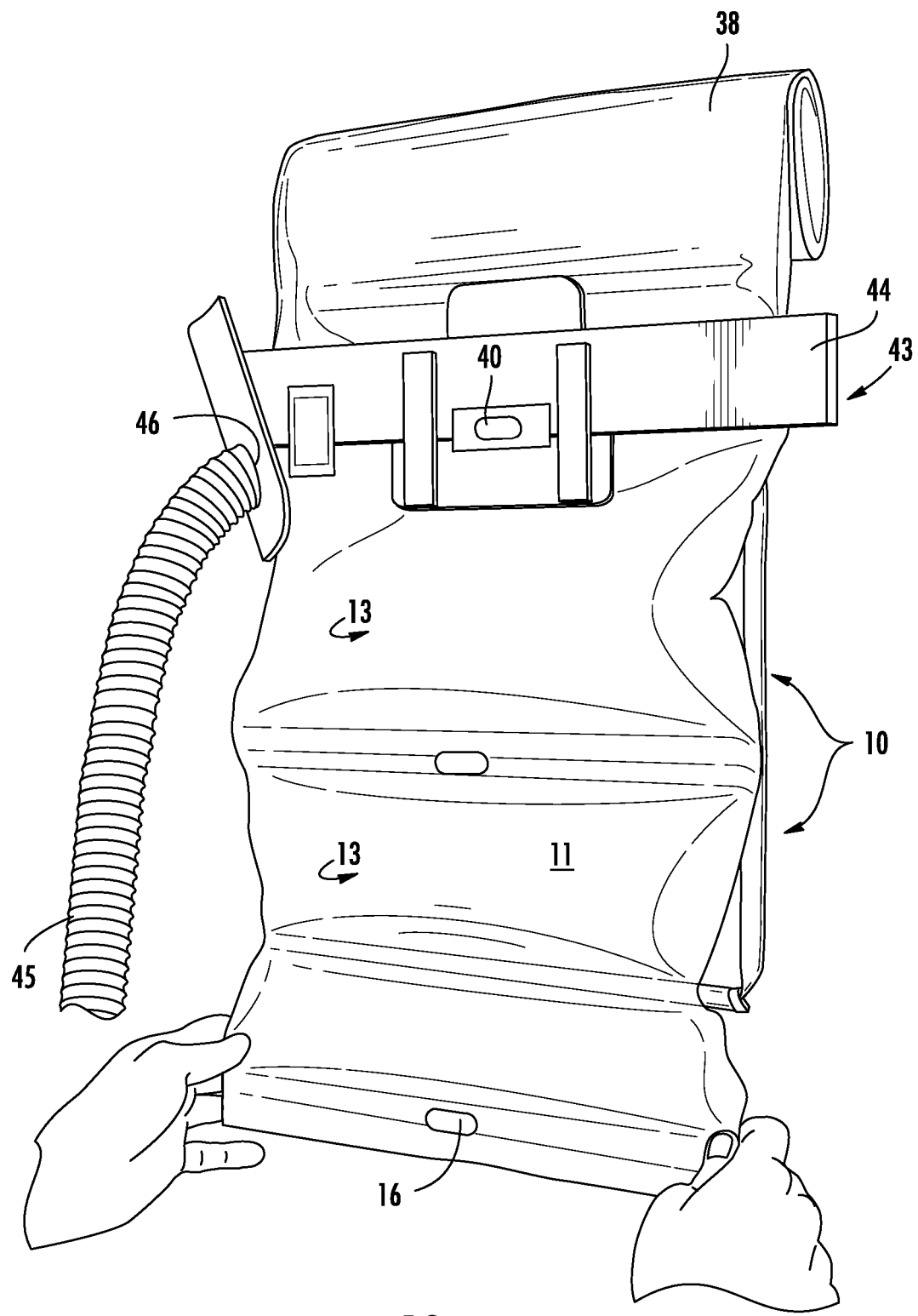
FIG. 13 is a perspective view of an embodiment of a wall-mounted roll-based inflatable structure inflation device in operation wherein the source of pressurized air is distant from the outlet.

As seen in FIGS. 10 and 13, the inflation device 43 may further include a mechanical registration device 40 for engaging locator apertures 16 in the inflatable structures 10. The mechanical registration device 40 and locator apertures 16 can take a number of different corresponding forms. For example, the locator aperture 16 could be a slit, as shown in FIGS. 2, 3, and 7 or a rectangular shape with rounded corners, such as is shown in FIGS. 1, 4, 5, and 13. The mechanical registration device 40 takes a corresponding shape such as the rectangular embodiment with rounded corners as shown in FIG. 13, so as to temporarily engage the locator aperture 16 and hold the inflatable structure 10 in place.

In operation, the outlet 46 of the source of pressurized air 45 is proximate to the valve 14 when the inflatable structure 10 holder 42 dispenses the inflatable structure. This can be facilitated through use of the mechanical registration device 40. The mechanical registration device 40 temporarily engages locator apertures 16 which may be located in the perimeter seals 15 separating multiple inflatable structures 10. Hence the mechanical registration device 40 temporarily holds an inflatable structure 10 in such a position so as to allow for the outlet 46 of the source of pressurized air 45 to be near the valve 14 of the inflatable structure 10 and fill it with air. Alternatively, a visual indicator may be used to determine when the valve 14 is proximate to the outlet 46 of the source of pressurized air 45. For example, a line can be drawn on the inflatable structure 10 that matches up to a line on the inflation device 43 when the valve 14 is proximate to the outlet 46 of the source of pressurized air 45. Alternatively, an indicator on the inflation device 43 may line up with the perimeter seals 15 separating multiple inflatable structures 10. Various other such visual indicators may also be used.

This embodiment and the other embodiments shown and described in this application are all designed to allow for inflation-at-a-distance. This means that the outlet 46 of the source of pressurized air 45 and the inflatable structure 10 do not have to have any physical contact. The air flow 32 alone is capable of opening the valve 14 and filling the inflatable structure 10 without necessitating the use of an inflation needle, wand, nozzle, or other similar structures.

In this previously described embodiment shown in FIGS. 10-13 the inflation device 43 can inflate and dispense a continuous web of inflatable structures 10 held by an inflatable structure holder 42. Another such embodiment is shown in FIG. 16. In this embodiment, the holder 42 is designed to hold a continuous web of inflatable structures 10 that are in a folded form 47 and held by a pair of rods 48. These rods 48 are a type of mechanical registration device 40 that function similarly to the above described embodiments in that they help temporarily locate the valve 14 of the inflatable structure 10 proximate to the outlet 46 of a source of pressurized air 45 when an inflatable structure is pulled down from the holder 42.

However, alternate embodiments are contemplated such as the embodiments shown in FIGS. 14 and 15 wherein the inflatable structure 10 inflation device 43 is designed to fill inflatable structures which are packaged together in a cartridge 36. These embodiments can make use of an alternative type of an inflatable structure 10 holder 42 in the form of a clamp, which holds the inflatable structures together as a cartridge 36. The holder 42 can hold each of the inflatable structures 10 together by engaging a second edge portion 28 in the flexible film 11 that extends beyond a first edge portion 27 in the flexible film, as shown in FIGS. 14 and 15. This allows the valve 14 of the outermost inflatable structure 10 to remain exposed such that it can receive an air flow 32 exiting the outlet 46 of the source of pressurized air 45, and may further use the air flow to pin down at least a portion of the inflatable structure, such as the flexible film 11 extending from the second edge portion 28, during inflation. The holder 42 can also include one or more pins 49 holding the cartridges 36 together, as shown in FIG. 15. Additionally, the holder 42 can also comprise a diverter 50 so as to redirect the air flow 32 exiting the outlet 46 of the source of pressurized air 45 toward a valve 14 in the inflatable structure 10.

The methods of inflating the inflatable structures 10 will now be described. These methods of filling inflatable structures 10 do not necessitate physical contact between the outlet 46 of the source of pressurized air 45 and the inflatable structure 10. Further, the methods are herein meant to describe the use of air flow 32 that is either high pressure or low pressure. Low pressure air flow 32 refers to air flow which may be produced by a fan or blower or human-powered inflation (e.g., whistling or blowing), whereas high pressure air flow refers to compressed air.

While the inflation methods are herein described with respect to a particular order of steps, it is to be understood that such ordering will not necessarily be required, and that alternative ordering of steps and variations on the steps are possible. Further, for simplicity's sake, the inflation will generally be discussed in terms of inflating the inflatable structures 10 with air, although other gases or fluids such as water or liquid foodstuffs or medical products can be used.

Figure 11:
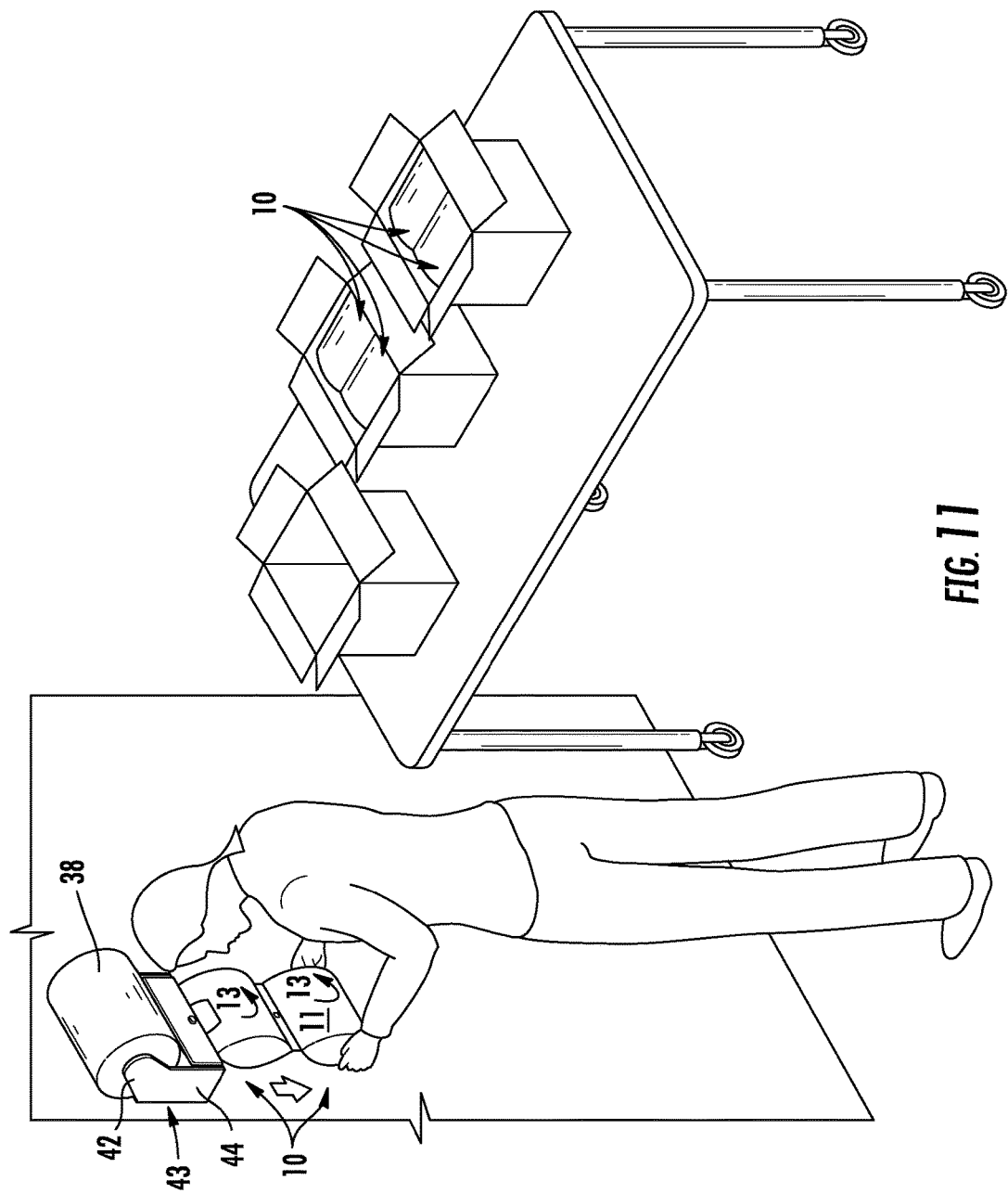
FIG. 11 is a perspective view of an embodiment of a wall-mounted roll-based inflatable structure inflation device in operation.
Figure 12:
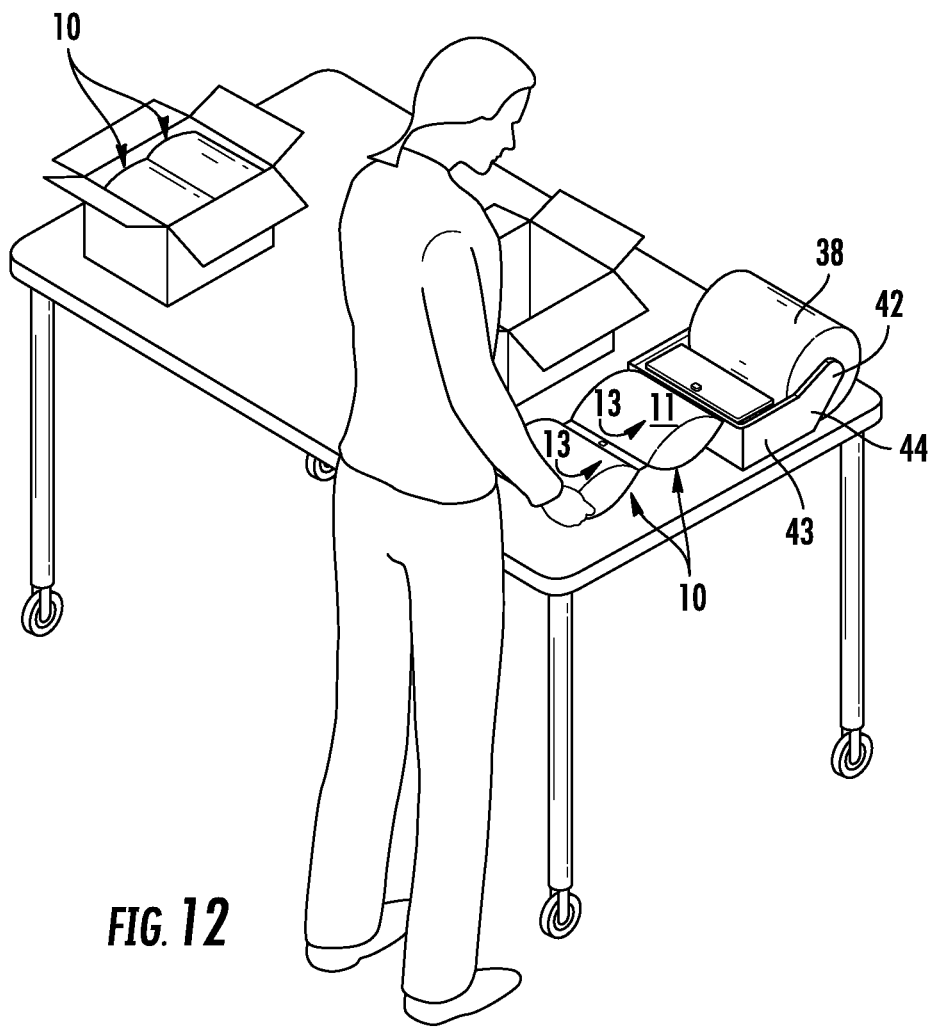
FIG. 12 is a perspective view of an embodiment of a table-mounted roll-based inflatable structure inflation device in operation.

Additionally, the methods of inflating inflatable structures 10 are largely described in terms of manual human operation of the inflation device 43. However, the inflation device 43 may be fully or partially automated. For example, a drive motor may be used to feed the continuous web of inflatable structures 10 through the inflation device 43. The inflation device 43 may further be equipped with a controller that automatically fills the inflatable structures 10 with the desired amount of air. Furthermore, in some automatically driven embodiments, mechanical registration device 40 and locator apertures 16 may or may not be necessary, as the drive motor controller could stop the advance of the web of inflatable structures 10 to optimally allow for inflation. In particular, the drive motor could be commanded to stop with the valve 14 proximate to the outlet 46 of the source of pressurized air 45 when an optical sensor reads a visual indicator on the inflatable structure 10. Alternatively, the drive motor can be commanded to run slow enough to allow the inflatable structures 10 to fill without stopping for each inflatable structure. Also, the inflation device 43 may be oriented in a number of different ways. For example, the inflation device 43 may be wall-mounted, as shown in FIGS. 11 and 13, or table-mounted, as shown in FIG. 12.

With regard to the embodiments of the inflatable structure 10 inflation device 43 shown in FIGS. 10-13 and 16, their operation will now be described. An operator may first secure a continuous web of inflatable structures 10 with the holder 42. The operator can then turn on the source of pressurized air 45, which may constitute a blower. Next, the operator may pull on the first inflatable structure 10 until a valve 14 in the inflatable structure is proximate to the outlet 46 of the source of pressurized air 45. If the inflatable structure 10 inflation device 43 is equipped with a mechanical registration device 40 and the continuous web of inflatable structures is equipped with corresponding locator apertures 16, the continuous web of inflatable structures will stop when the mechanical registration device engages a locator aperture, and the inflatable structure inflation device is designed to have the outlet 46 of the source of pressurized air 45 proximate to the valve 14 at this point. Alternately, or additionally, the inflatable structure 10 or the inflation device 43 or both may have a visual indicator which reaches a point of optical alignment when the valve 14 is proximate to the outlet 46 of the source of pressurized air 45. Alternately, the operator may simply pull on the continuous web of inflatable structures 10 and not stop each time a valve 14 passes the outlet 46 of the source of pressurized air 45. This is possible when the source of pressurized air 45 emits sufficient air flow 32.

When the valve 14 and outlet 46 are thus proximate to each other, the source of pressurized air 45 will fill the inflatable structure 10 with air. "Proximate" here means that the valve 14 and the outlet 46 of the source of pressurized air 45 are located relative to one another such that an air flow 32 from the outlet reaches the valve and is able to penetrate the valve and enter into an enclosed chamber 13 in the inflatable structure 10, as shown in FIG. 8. As is the case throughout this application, the source of pressurized air 45 does not have to operate at a high pressure nor does the outlet 46 require contact with the inflatable structure 10. Instead, the source of pressurized air 45 may emit a low pressure air flow 32, and the outlet 46 may be physically separated from the inflatable structure 10. Once the inflatable structure 10 has reached the desired level of fullness, the operator can then either repeat the previous steps by pulling on the continuous web of inflatable structures to access the next inflatable structure, or the operator can tear the filled inflatable structure off from the remainder of the continuous web of inflatable structures. Filling of an inflatable structure 10 may substantially automatically lift the locator aperture 16 off of the mechanical registration device 40 such that the inflation device 43 is ready to advance the continuous web of inflatable structures 10 and fill the next inflatable structure 10. Also, the mechanical registration device 40 may be joined to the remainder of the inflation device 43 by a hinge or flexible connector such that the inflation of the inflatable structure 10 dislodges the mechanical registration device from the locator aperture 16.

The amount of air that fills the inflatable structure 10 may be controlled in a number of ways. One such method is by visual inspection of the inflatable structure 10 whereby the operator would remove the inflatable structure from proximity with the outlet 46 of the source of pressurized air 45 when the inflatable structure is filled with the desired amount of air. Alternatively, the inflatable structure 10 may automatically release from the inflation device 43 when the mechanical registration device 40 dislodges from the locator aperture 16 upon the filling of the inflatable structure, as discussed above. An alternative or additional way of controlling the level of inflation is to use inflation restriction structures to control the dimensions of the inflatable structure 10 as it inflates. Inflation restriction structures can take the form of plates or bars between which the inflatable structures 10 inflate. As the inflatable structures 10 fill, the inflation restriction structures can restrict the dimensional expansion of the inflatable structures, and hence limit the amount of air that fills the inflatable structures.

With regard to the embodiments of the inflation device 43 shown in FIGS. 14, and 15, the method of operation will now be described. In these embodiments, the operation may begin by placing a cartridge 36 of inflatable structures 10 in the holder 42. The inflatable structures 10 may be connected to one another prior to insertion in the holder 42, as through use of a staple, heat seal, or adhesive, or the holder can operate to clamp them together. The operator may then turn on the source of pressurized air 45, which results in an air flow 32. The outlet 46 of the source of pressurized air 45 can be aimed at the valve 14 of the outermost inflatable structure 10. Alternatively it may be aimed at the holder 42, which can comprise a diverter 50 to direct the air flow 32 toward the valve 14 of the outermost inflatable structure 10. When the inflatable structure 10 has reached the desired level of fullness, the operator then removes the inflatable structure. Removing the filled inflatable structure 10 may involve pulling the inflatable structure out from the holder 42. The process can then be repeated to inflate additional inflatable structures 10.

Figure 17:
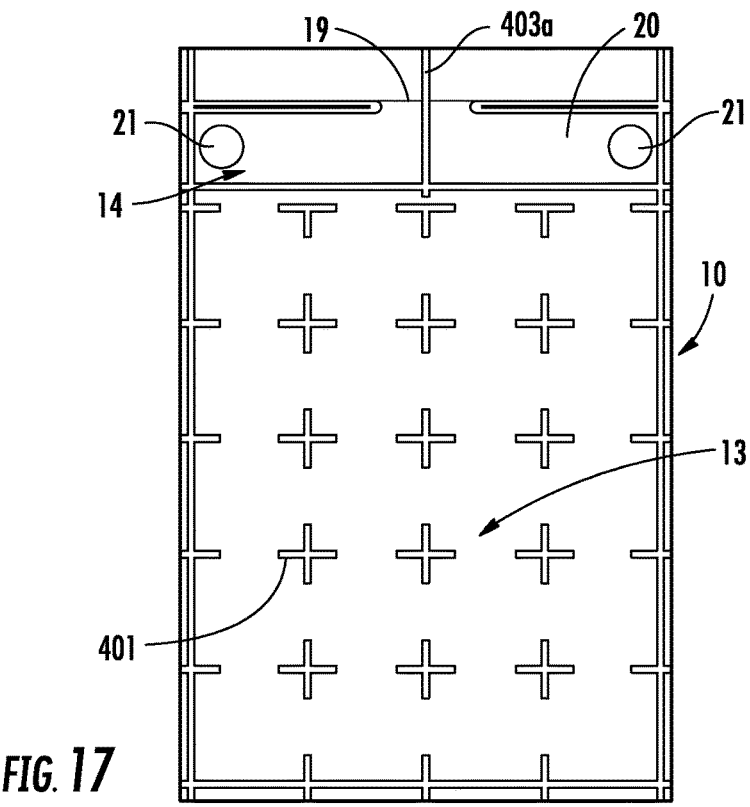
FIG. 17 is a top view of an embodiment of an inflatable structure having two internal valve openings, a plurality of quilting seals, and a straight valve position-retention seal.

Many additional embodiments of inflatable structures and associated apparatuses and methods are provided. For example, FIG. 17 illustrates an embodiment of an inflatable structure 10 comprising two internal valve openings 21. Use of two internal valve openings 21 may allow for more rapid inflation of the inflatable structure 10 by providing multiple paths through which air may travel in order to inflate the enclosed chamber 13.

Figure 19:
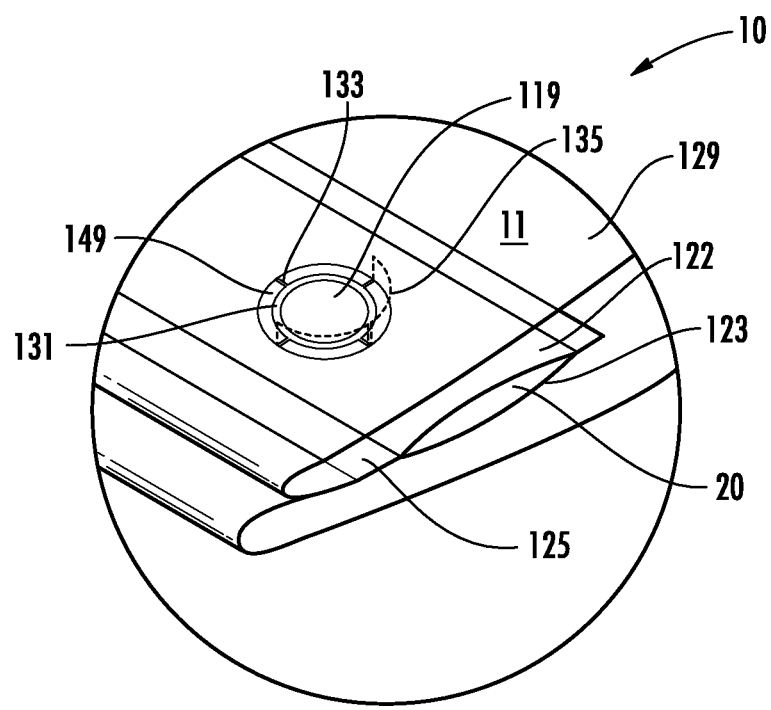
FIG. 19 is a partial sectional view of an embodiment of an inflatable structure with an external valve opening extending through multiple layers of flexible film and comprising sail cuts.
Figure 20:
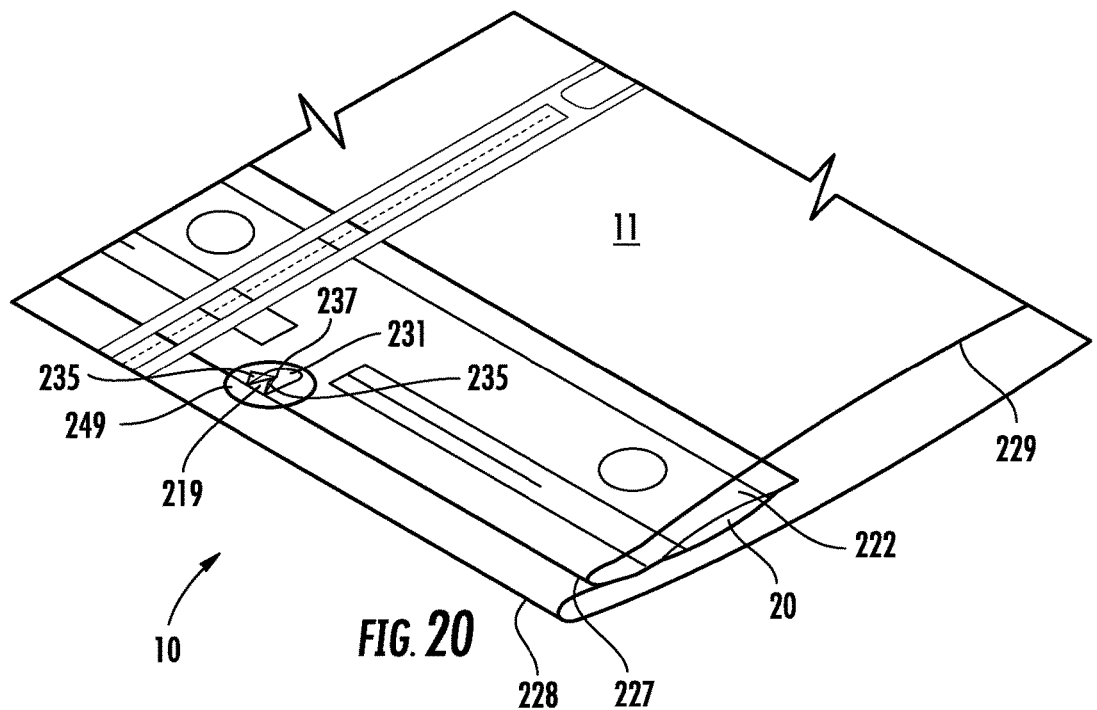
FIG. 20 is a partial perspective view of an embodiment of an inflatable structure with an external valve opening comprising a slit extending though multiple layers of flexible film, and which is also defined by edge portions formed by folding the flexible film.
Figure 21:
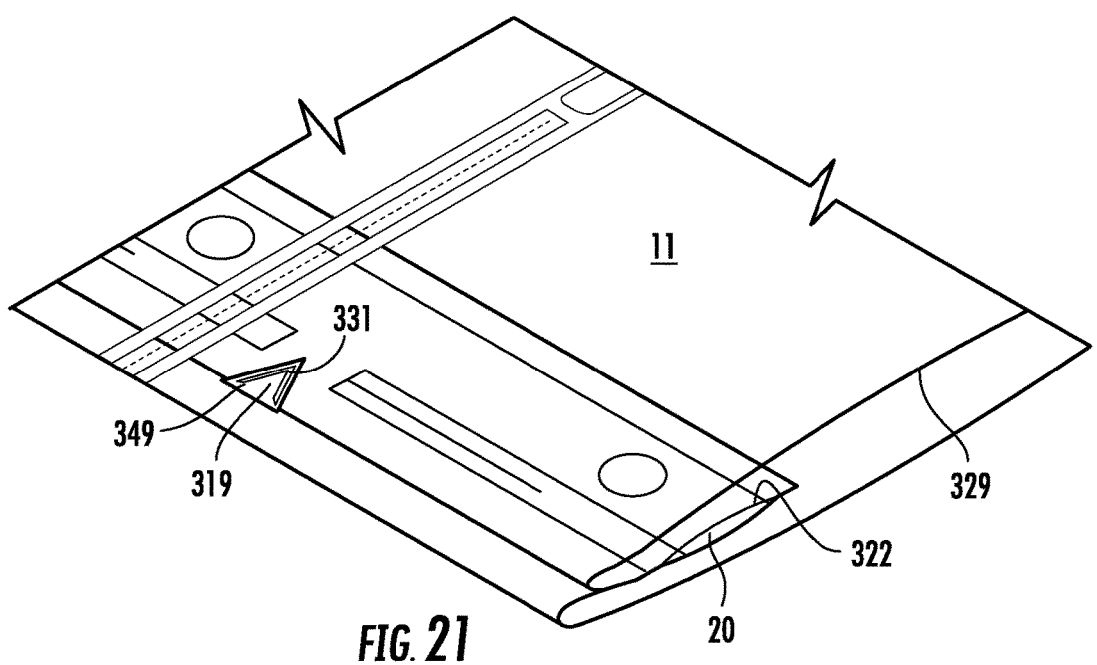
FIG. 21 is a partial perspective view of an embodiment of an inflatable structure with a v-shaped external valve opening extending though multiple layers of flexible film, and which is also defined by edge portions formed by folding the flexible film.

Alternatively or additionally, embodiments of inflatable structures may comprise different types of external valve openings from those previously described. For example, FIG. 19 illustrates a partial view of an embodiment of an inflatable structure 10 comprising an external valve opening 119, which may be circular, extending through multiple layers of flexible film 11. In particular, the external valve opening 119 extends through a first layer 129 of the flexible film 11 and a second layer 122 of the flexible film. Note that the first and second layers referenced in embodiments wherein the external valve opening at least partially extends through the first and second layers (as illustrated in FIGS. 19-21) refer to the layers extending from an edge portion (see, e.g., layers 222 and 229 extending from edge portion 227 in FIG. 20) as opposed to those extending from an internal edge portion as described in other embodiments (see, e.g., layers 29 and 30 extending from internal edge portion 24 in FIG. 1). To prevent air from leaking out between the first layer 129 and the second layer 122 at the external valve opening 119, these two layers can be sealed together surrounding at least a portion of the external valve opening.

One method of sealing the first layer 129 and the second layer 122 of flexible film 11 together involves applying heat resistant ink 149 in the channel 20. Thereafter, the first layer 129 and the second layer 122 may be sealed together by heat sealing to form a seal 131, with the external valve opening 119 created through methods such as melting through the first and second layers. Thus, the resulting external valve opening 119 may have a different orientation than the above-described embodiments of external valve openings. Accordingly, inflation of the inflatable structure 10 may be accomplished from different angles than the above-described embodiments. As a result of extending the external valve opening 119 through the first layer 129 and the second layer 122 of the flexible film 11, the seal 125 between the second layer and a third layer 123 of the flexible film may be made continuous, because the air which inflates the inflatable structure 10 enters through a different direction. Additionally, the external valve opening 119 may be provided with sail cuts 133 which extend through the seal 131. The sail cuts 133 create one or more sails 135 which may lift in response to a flow of air and thereby facilitate inflation of the inflatable structure 10. In particular, they can be useful in overcoming any stickiness created by the heat resistant ink 149 in the channel 20.

Embodiments of external valve openings extending partially through multiple layers of the flexible film are also provided. One such embodiment, as illustrated in FIG. 20 is that of an inflatable structure 10 wherein the external valve opening 219 extends through first 229 and second 222 layers of the flexible film 11, but the external valve opening is also defined by edge portions 227, 228 of the flexible film which are formed by folding the flexible film. In such embodiments of the inflatable structure 10, the external valve opening 219 may comprise a slit 237 extending through the first 229 and second 222 layers of the flexible film 11. The slit 237 creates two sails 235 which may lift in response to a flow of air and thereby facilitate inflation of the inflatable structure 10 through the external valve opening 219 similarly to as described above. In an alternative, but otherwise similar embodiment, as illustrated in FIG. 21, the external valve opening 319 may be v-shaped.

Regardless of the particular shape of the external valve opening 119, 219, 319, the external valve opening can comprise a seal 131, 231, 331 as described above surrounding at least a portion of the external valve opening. In particular, the seal 131, 231, 331 can seal together the first 129, 229, 329 and second 122, 222, 322 layers of flexible film 11 around the portion of the external valve opening 119, 219, 319 that extends through the first and second layers of flexible film. Creation of the seal 131, 231, 331 may be facilitated as described above through use of a heat resistant ink 149, 249, 349 applied in the channel 20. Further, each of the above-described embodiments, as illustrated in FIGS. 19-21, are configured such that the external valve opening 119, 219, 319 defines an angle with respect to the channel 20. Thereby, the external valve opening 119, 219, 319 is positioned such that it is not substantially parallel with the channel 20, which such a relationship may assist in maintaining a seal once the inflatable structure 10 is inflated by forcing air within the inflatable structure to travel a tortuous path in order to exit the inflatable structure.

Figure 22:
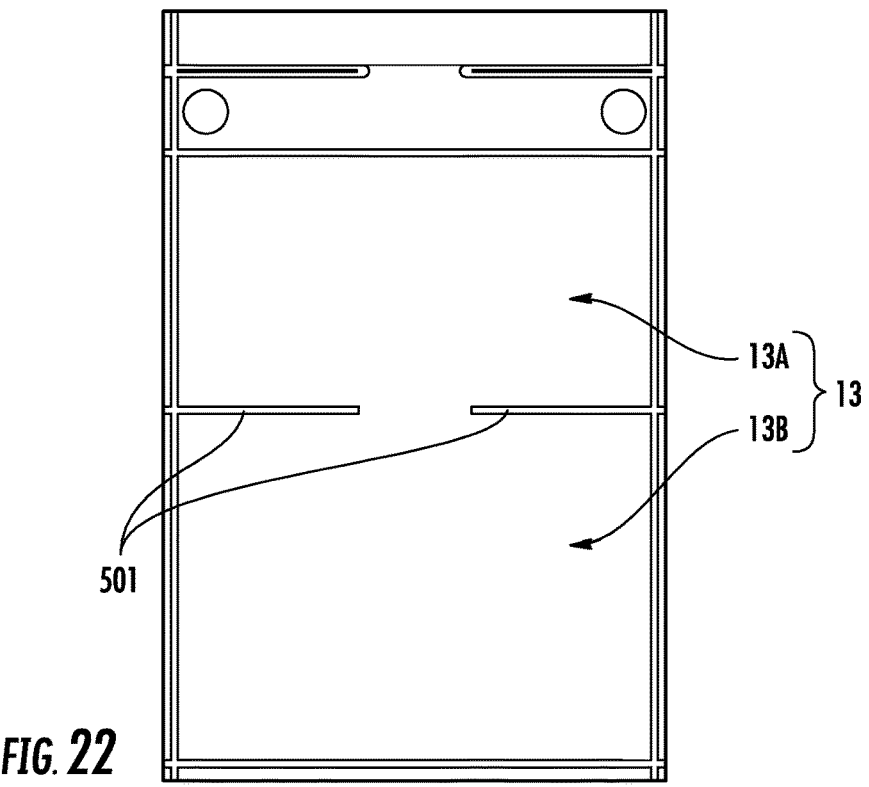
FIG. 22 is a top view of an embodiment of an inflatable structure comprising quilting seals separating the enclosed chamber into two partially enclosed chambers.
Figure 23:
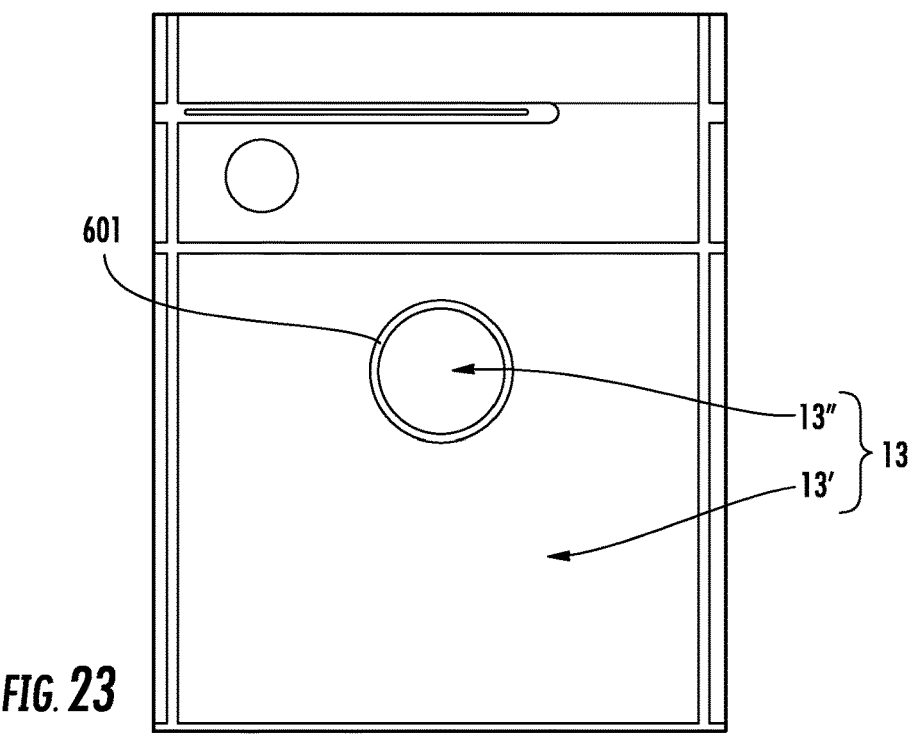
FIG. 23 is a top view of an embodiment of an inflatable structure comprising quilting seals separating the enclosed chamber into an inflatable chamber and an uninflatable chamber.

Embodiments of the above-described inflatable structures may further include additional features. For example, returning to FIG. 17, this embodiment of an inflatable structure 10 comprises a plurality of quilting seals 401 connecting sidewalls 29, 30 defining the enclosed chamber 13 (see, e.g. FIG. 1). This particular embodiment of quilting seals 401 produces a quilted bubble pattern when inflated. However, other patterns may be created. For example, FIG. 22 illustrates an embodiment in which quilting seals 501 separate the enclosed chamber 13 into two partially enclosed chambers 13A, 13B. Additional embodiments, such as the embodiment illustrated in FIG. 23 use one or more quilting seals 601 to divide the enclosed chamber 13 into one or more inflatable chambers 13' and one or more uninflatable chambers 13".

Figure 18:
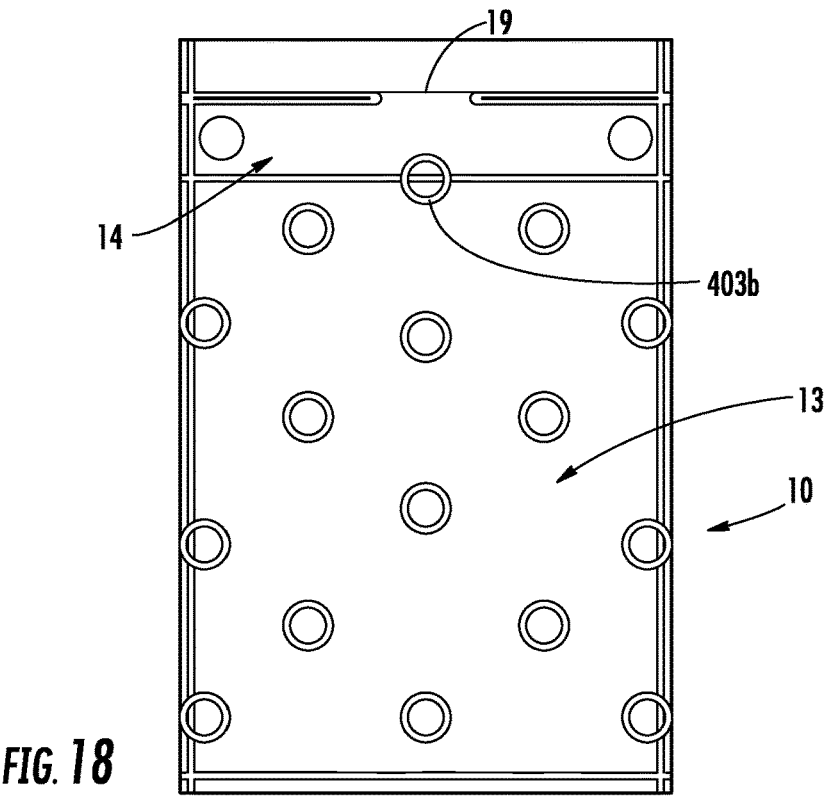
FIG. 18 is a top view of an embodiment of an inflatable structure having a circular valve position-retention seal.

Further embodiments of inflatable structures may include one or more valve position-retention seals configured to retain the position of the one-way valve. Valve position-retention seals help to prevent a portion of the one-valve from possibly pushing out of the external valve opening by connecting the one-way valve to the sidewalls defining the enclosed chamber. One embodiment of a valve position-retention seal 403a is illustrated in FIG. 17. The valve position-retention seal 403a seals together all of the layers of the inflatable structure 10 through the external valve opening 19, the channel 20, and the inflatable chamber 13. By sealing together all of the layers forming the inflatable structure 10, the one-way valve 14 is connected to the sidewalls 29, 30 (see, e.g. FIG. 1) forming the inflatable chamber 13, and hence this resists against the one-way valve being forced out of the external valve opening 19. An alternate embodiment of a valve position-retention seal 403b is illustrated in FIG. 18. In this embodiment the valve position-retention seal 403b comprises a circular shape, instead of the straight line shape of the embodiment of a valve position-retention seal 403a illustrated in FIG. 17. By sealing through all of the layers of the inflatable structure 10 such that the one-way valve 14 is sealed to the sidewalls 29, 30 (see, e.g. FIG. 1) as in the previously-described embodiment, the valve position-retention seal 403b may still retain the position of the one-way valve such that it may not be pushed out of the external valve opening 19 by pressure within the inflatable chamber 13.

Figure 24:
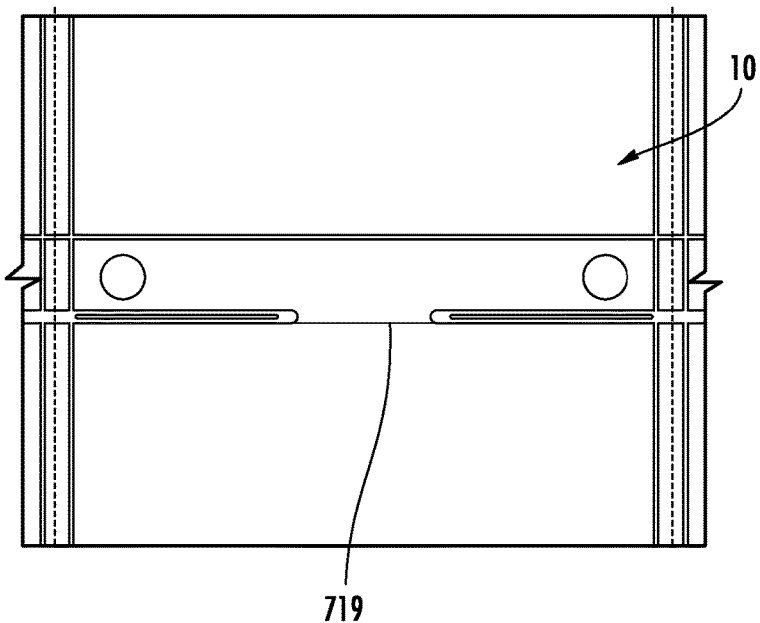
FIG. 24 is a top view of an embodiment of an inflatable structure having an external valve opening configured to be aligned with an opening in a container.
Figure 25:
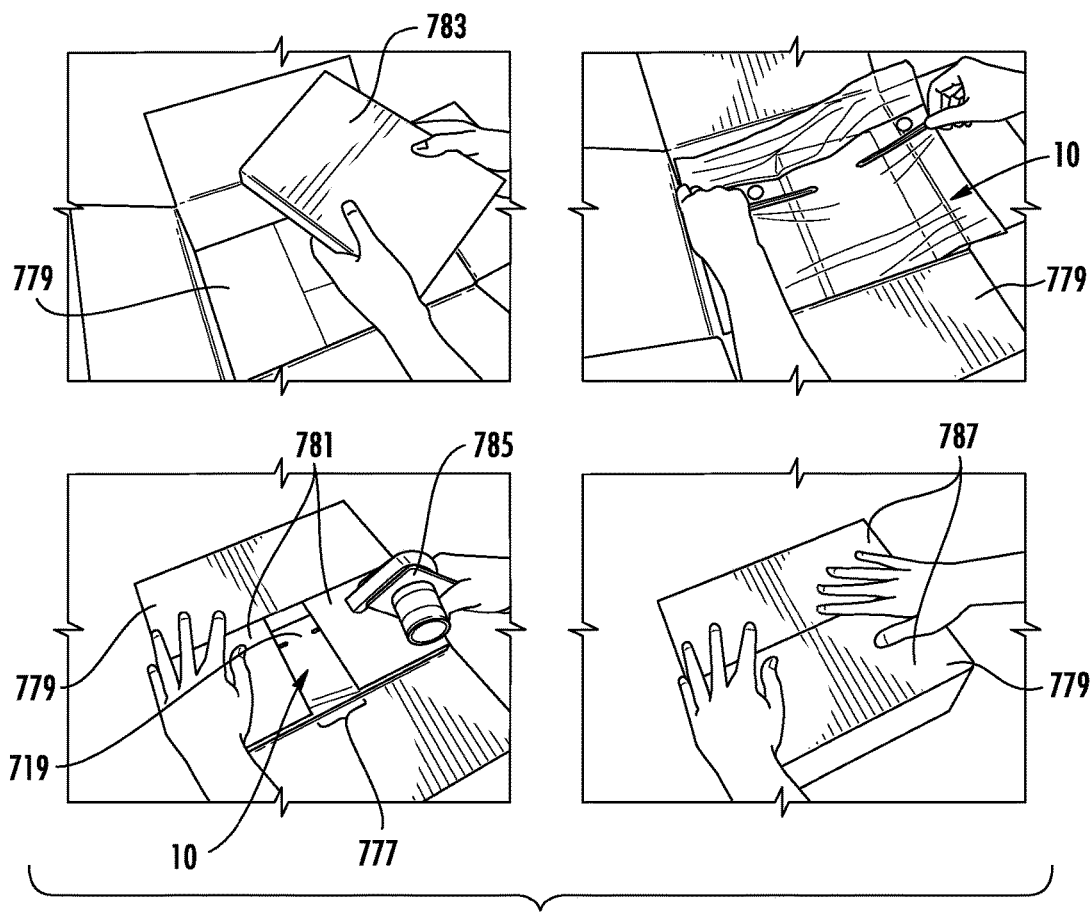
FIG. 25 is a sequence of steps illustrating packaging an item in a container using the inflatable structure of FIG. 24.

Embodiments of inflatable structures may also comprise features which facilitate their use as packaging in a container, such as a cardboard box. One such embodiment of an inflatable structure 10 is illustrated in FIG. 24. This inflatable structure 10 comprises an external valve opening 719 configured to be aligned with an opening 777 in a container 779 when the inflatable structure is placed in the container 779 (see FIG. 25). In the illustrated embodiment, the opening 777 is a space between flaps 781 which comprise portions of the container 779. As will be described below, aligning the external valve opening 719 with an opening 777 in the container 779 facilitates inflation of the inflatable structure 10 within the container 779.

A method of inflating inflatable structures for use in packaging an item in a container utilizing a source of pressurized air is also provided. The method comprises placing an inflatable structure 10 in a container 779 in proximity to the item 783 to be packaged and spaced at a distance from the source of pressurized air 785. In the illustrated embodiment, the item 783 to be packaged is placed first in the container 779, with the inflatable structure 10 on top, though other packaging orientations are possible. The method further comprises filing the inflatable structure 10 with a desired amount of air from the source of pressurized air 785. This may involve filling the inflatable structure 10 with air until the container 779 is substantially devoid of empty space, or the item 783 is securely fixed in place. In some embodiments the method may further comprise closing one or more flaps 781 of the container 779 prior to the step of filling the inflatable structure 10. This assists the user in determining when the container 779 is devoid of empty space. The method may additionally comprise aligning the external valve opening 719 of the inflatable structure 10 with the remaining open portion 777 of the container 779 which is created by the step of closing the flaps 781. By aligning the external valve opening 719 in this manner, inflation of the inflatable structure 10 is facilitated. For example, the source of pressurized air 785 may then be positioned outside of the container 779. Once the inflatable structure 10 is inflated, any remaining flaps 787 may be closed, and the container 779 may then be sealed.

Figure 26:
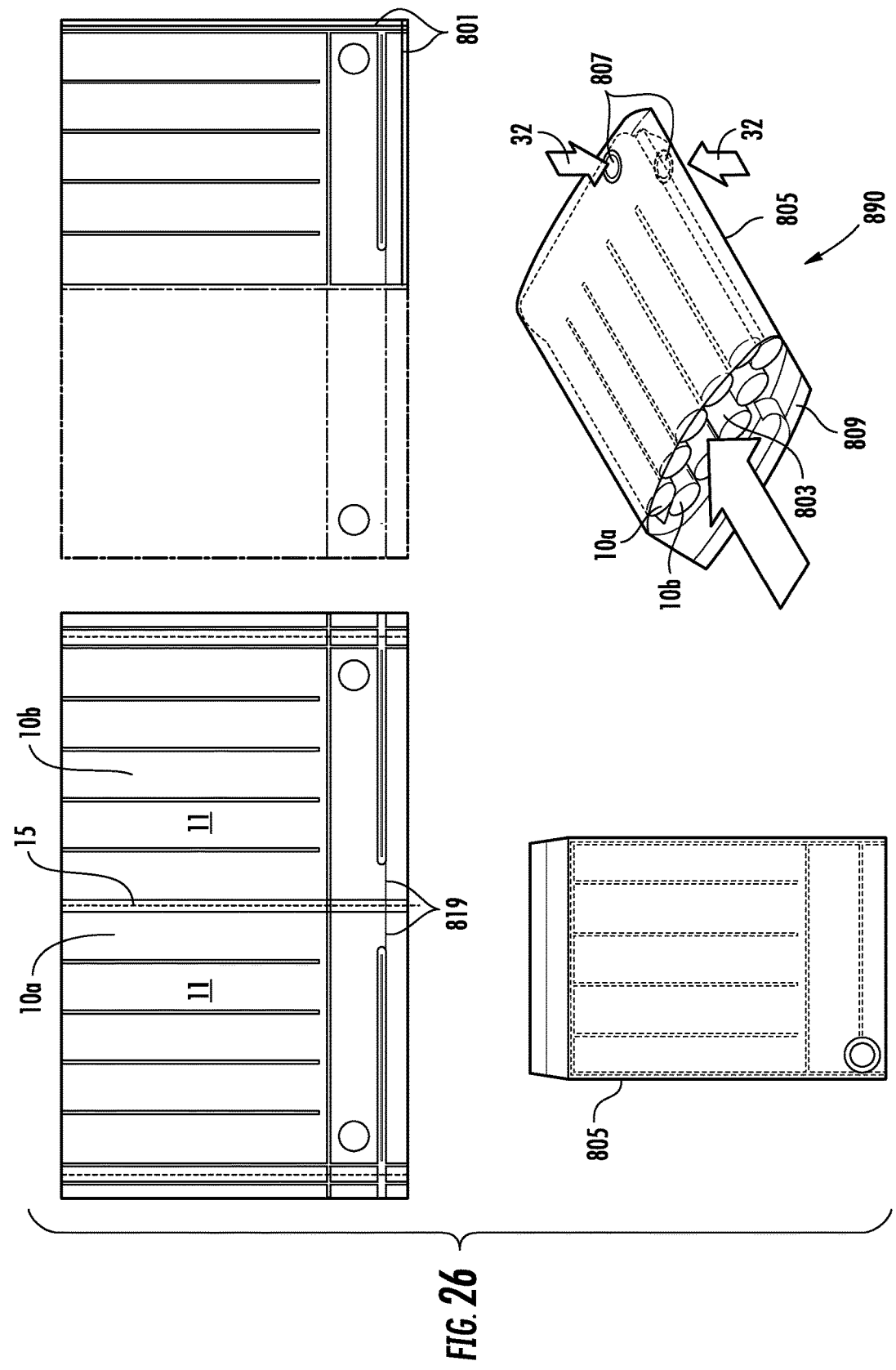
FIG. 26 illustrates multiple views of an inflatable assembly.

Additional embodiments of the invention comprise an inflatable assembly for use in packaging. FIG. 26 illustrates a first inflatable structure 10a and a second inflatable structure 10b which may comprise parts of the inflatable assembly 890. The inflatable structures 10a, 10b may be similar to the above-described inflatable structures and may be formed by the same or similar methods. However, the inflatable structures 10a, 10b may further comprise one or more connecting seals 801 connecting the first inflatable structure and the second inflatable structure. In order to seal the inflatable structures 10*a*, 10*b* together the flexible film 11 may first be folded proximate one of the perimeter seals 15, with the two inflatable structures then sealed together with the connecting seals 801. The connecting seals 801 create a partially enclosed cavity 803 between the first inflatable structure 10*a* and the second inflatable structure 10*b*. As further illustrated in FIG. 26, the inflatable structures are inserted into an outer pouch 805 with at least one inflation aperture 807 therethrough. The inflation apertures 807 align with external valve openings 819 in the inflatable structures 10*a*, 10*b* when the inflatable structures are inserted into the outer pouch 805. Thus, air 32 can be directed through the inflation apertures 807 in the outer pouch 805 and into the external valve openings 819 to thereby inflate the inflatable structures 10*a*, 10*b*. This may occur after an item is inserted into the partially enclosed cavity 803 and a flap 809 is closed, in order to securely package the item in the inflatable assembly 890.

Figure 27:
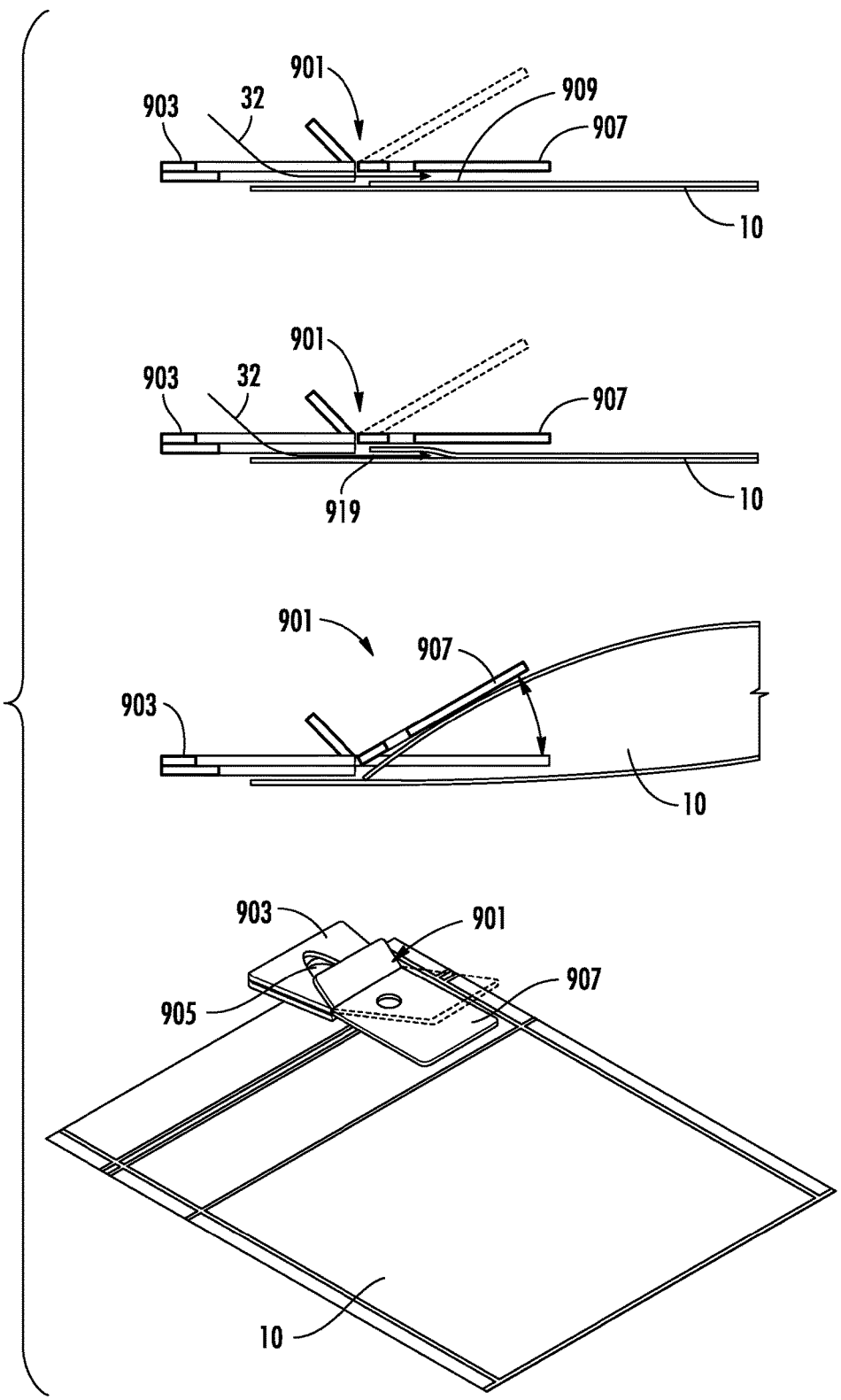
FIG. 27 illustrates multiple views of an apparatus configured to facilitate inflation of an inflatable assembly.

An additional embodiment of the invention comprises an apparatus configured to facilitate inflation of inflatable structures. As illustrated in FIG. 27, the apparatus 901 comprises a base plate 903 with an aperture 905 therethrough, and a hinged plate 907 hingedly connected thereto. The aperture 905 is configured to direct a flow of air 32 through the aperture 905 and toward an external valve opening 919 and an outer surface 909 of an inflatable structure 10. The flow of air 32 creates an area of low pressure between the outer surface 909 of the inflatable structure 10 and the hinged plate 907, which aids in opening the external valve opening 919. As a secondary function, the hinged plate 907 may be configured to actuate a switch (not shown) which shuts off the flow of air 32 when the hinged plate hingedly pivots as a result of the inflatable structure 10 filling with air. Accordingly, the flow of air 32 may be automatically stopped when the inflatable structure 10 is filled to a desired thickness.

FIG. 28 illustrates an additional embodiment of an inflatable structure 1000. The inflatable structure 1000 may include some or all of the features described above with respect to other embodiments of inflatable structures. In this regard, the inflatable structure 1000 illustrated in FIG. 28 comprises a flexible film 1011 defining sidewalls (see, e.g., the previously described sidewalls 29, 30) forming an enclosed chamber 1013. The enclosed chamber 1013 is defined at least in part by perimeter seals 1015 that may substantially enclose a one-way valve 1014. The one-way valve 1014 may be defined at least in part by the flexible film 1011 and configured to receive pressurized air to thereby inflate the enclosed chamber 1013. The one-way valve 1014 may comprise a channel 1020, one or more internal valve openings 1021*a*, 1021*b*, and an external valve opening 1019. The external valve opening 1019 may be defined at least in part by edge portions 1127, 1128 of first and second layers of the flexible film 1011 that form the one-way valve 1014, as previously described with respect to other embodiments disclosed herein.

As also described above, one side of the valve 1014 may be bounded by an internal edge portion 1024 which may comprise a fold, a weld, or a combination of the two between the first layer and second layer of the flexible film 1011. The other side of the valve 1014 may be bounded by a discontinuous seal 1025 between the first and second layers of the flexible film material 1011 that helps to define the channel 1020. The discontinuity of the seal 1025 forms the external valve opening 1019 at the location(s) where the seal does not exist. Thus, the external valve opening 1019 is capable of communicating with the channel 1020 and the internal valve openings 1021*a*, 1021*b* during inflation as previously described. Slits 1033 may be provided in the discontinuous seals 1025. The slits 1033 may function to separate the one-way valve 1014 from the rest of the inflatable structure 1000 to some degree, and therefore help to prevent accidental discharge of air from the enclosed chamber 1013 when the inflatable structure is vibrated or otherwise disturbed.

The inflatable structure 1000 of FIG. 28 is also illustrated as including quilting seals 1601. The quilting seals 1601 may connect the sidewalls defining the enclosed chamber 1013. The quilting seals 1601 divide the enclosed chamber 1013 into an inflatable chamber 1013' and a plurality of uninflatable sections 1013". However, FIG. 28 illustrates an embodiment of the quilting seals 1601 that applicant has determined provides superior performance in terms of maintaining the integrity of the inflatable structure 1000 when subjected to tests such as drop tests (whereby an objected is attached to the inflated inflatable structure and dropped) and a low pressure test (whereby the inflated inflatable structure is subjected to sub-atmospheric pressures to simulate pressures encountered during air shipment).

As illustrated, the quilting seals 1601 may define an enclosed elongated shape with straight parallel sides and rounded ends. The quilting seals 1601 may divide the inflatable chamber 1013' into a plurality of sub-sections 1047 that may each define a substantially tubular form when inflated. The tubular subsections 1047 may provide an enhanced cushioning function and the uninflatable sections 1013" may separate the tubular sections to facilitate bending of the inflatable structure 1000 into a desired configuration. Thereby, the inflatable structure 1000 may be configured as appropriate for use in packaging goods for shipment or other applications.

Further, the inflatable structure 1000 may include a locator aperture 1016 defined in the channel 1020. In this regard, the locator aperture 1016 may assist in positioning the one-way valve 1014 in a desired position relative to an outlet of an inflation device, as will be described below. The inflatable structure 1000 may further comprise a valve position-retention seal 1403 located in the channel 1020 and configured to retain the position of the one-way valve 1014. The valve position-retention seal 1403 may retain the position of the one-way valve 1014 by connecting the one-way valve to the sidewalls of the inflatable structure 1000. Specifically, the valve position-retention seal 1403 may connect the first and second layers of the flexible film 1011 defining the channel 1020 to the sidewalls and thereby resist movement of the channel of the one-way valve 1014 as explained below.

In particular, the valve position-retention seal 1403 may prevent the one-way valve 1014 from being forced out through the external valve opening 1019 by air pressure within the inflatable chamber 1013. Further, without the valve position-retention seal 1403, the flexible film 1011 may tear at the discontinuous seals 1025 defining the external valve opening 1019 as the one-way valve is forced out through the external valve opening. Accordingly, the valve position-retention seal 1403 may prevent internal portions of the one-way valve 1014 (e.g., the channel 1020 and the internal edge portion 1024) from breaching the external valve opening 1019 and/or tearing at the discontinuous seals 1025 and the integrity of the one-way valve 1014 may be retained so as to substantially prevent leakage.

Figure 29:
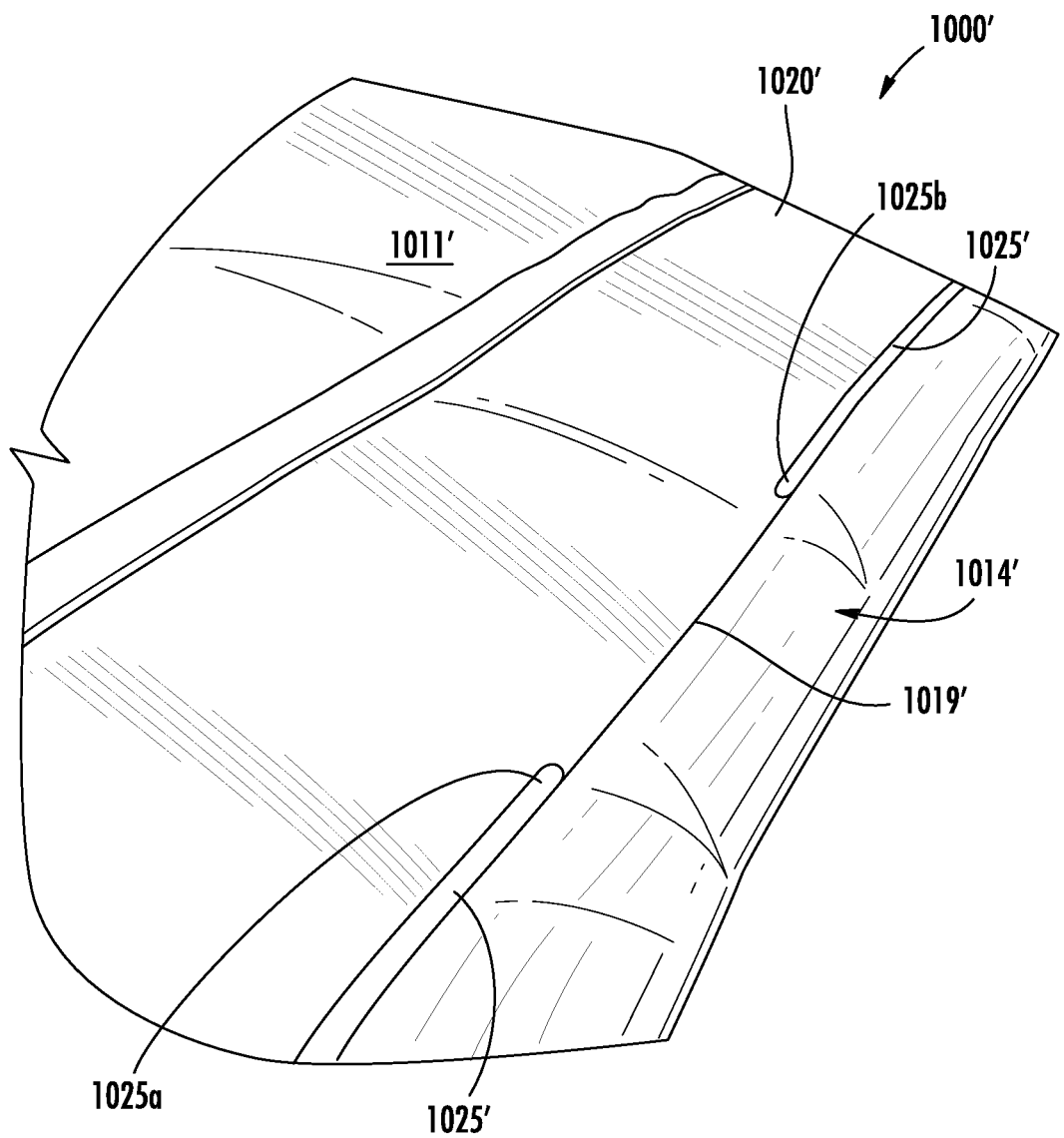
FIG. 29 illustrates a perspective view of an embodiment of an inflatable structure similar to that illustrated in FIG. 28, but wherein the one-way valve does not include a locator aperture positioned in the channel and surrounded by a valve position-retention seal.
Figure 30:
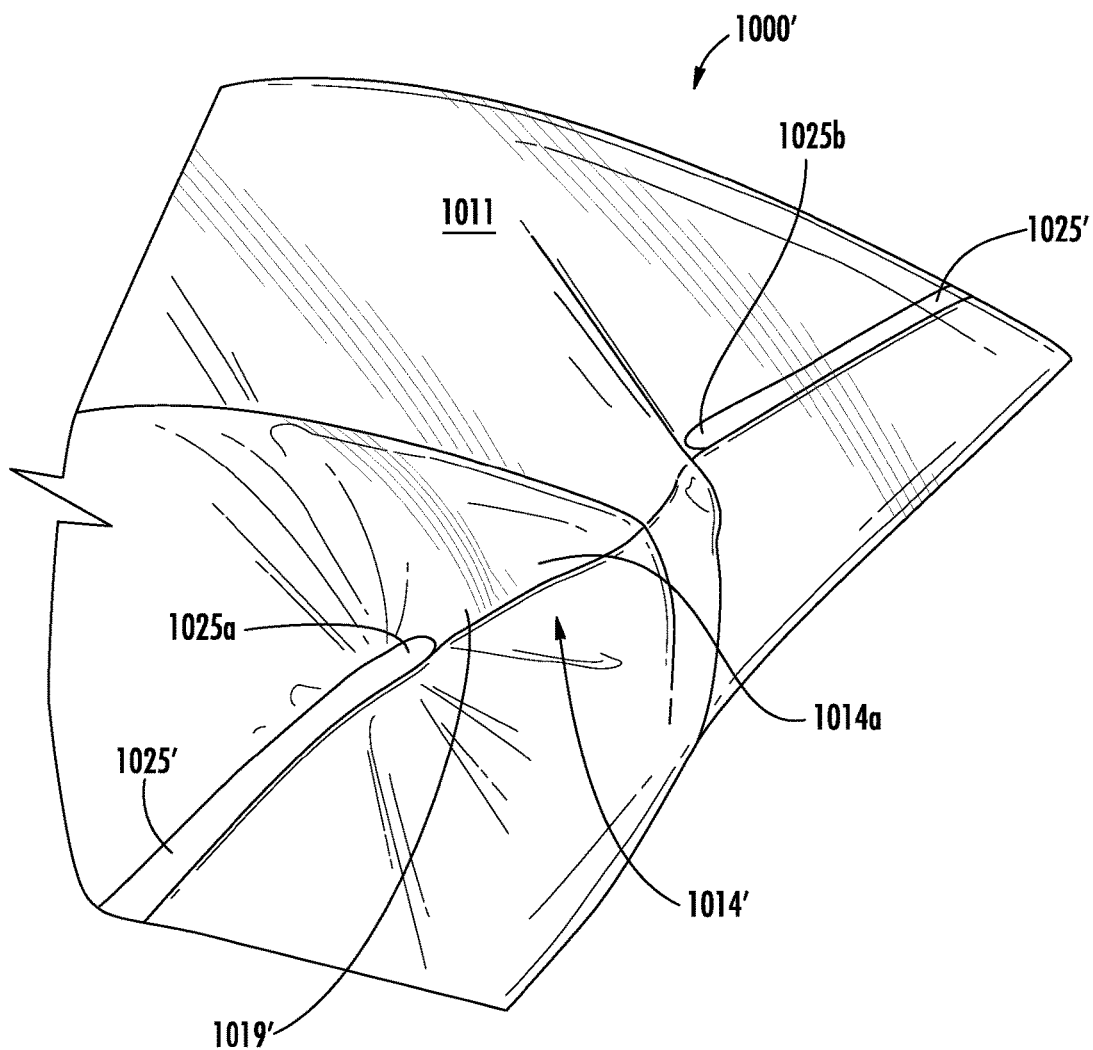
FIG. 30 illustrates the inflatable structure of FIG. 29 when the one-way valve fails and a portion of the one-way valve extends through an external valve opening of the one-way valve.

In this regard, FIGS. 29 and 30 illustrate an inflatable structure 1000' that does not include the valve position-retention seal 1403, but which is otherwise similar to the inflatable structure 1000 illustrated in FIG. 28. FIG. 29 illustrates the one-way valve 1014' when the inflatable structure 1000' is inflated. As illustrated, the inflation channel 1020' retains a substantially flat configuration whereby the two layers forming the inflation channel are in contact with one another and thereby the channel substantially prevents air from leaking from the inflatable structure 1000' through the internal valve opening (not shown), the inflation channel, and out through the external valve opening 1019'.

However, as illustrated in FIG. 30, it may be possible for a portion 1014*a* of the one-way valve 1019' to breach the external valve opening 1019'. The one-way valve 1014' may also be deformed such that the two layers of flexible film 1011' come out of contact with each other in the channel, allowing air to travel therethrough and out of the external valve opening 1019'. This may occur, for example, as a result of the inflatable structure 1000' being subjected to impact, compressive force, vibration, or sub-atmospheric pressures such as may occur during shipping. The flexible film 1011' may also tear near ends 1025*a*, 1025*b* of the discontinuous seal 1025' defining the external valve opening 1019'. Accordingly, the valve position-retention seal described above may be employed to prevent movement of the one-way and thereby substantially prevent the one-way valve from tearing or partially breaching the external valve opening so as to thereby maintain the integrity of the one-way valve.

The valve position-retention seal 1403 illustrated in FIG. 28 may also serve to prevent leakage from the enclosed chamber 1013 through the locator aperture 1016. In this regard, the valve position-retention seal 1403 may at least partially surround the locator aperture 1016 and seal the layers of the flexible film 1011 defining the channel 1020 to the sidewalls defining the enclosed chamber 1013. For example, in the illustrated embodiment the locator aperture 1016 is circular in shape, and the valve position-retention seal 1403 is round and concentric with the locator aperture. However, the locator aperture 1016 and the valve position-retention seal 1403 do not need to be circular or share a common center in all embodiments. In some embodiments, the valve position-retention seal 1403 may entirely surround the locator aperture 1016, as illustrated. In an alternate embodiment the valve position-retention seal 1403 may partially surround the locator aperture 1016 and connect to the internal edge portion 1024 such that leakage through the locator aperture is prevented by the valve position-retention seal in combination with the internal edge portion fully surrounding the locator aperture.

As noted above, the locator aperture 1016 may assist in positioning the one-way valve 1014 in a desired position relative to an outlet of a source of pressurized air. In this regard, the locator aperture 1016 (and the valve position-retention seal 1403 in some embodiments) may be centrally disposed with respect to the external valve opening 1019. Accordingly, the locator aperture 1016 may align with the external valve opening 1019 and when the locator aperture is employed to position the inflatable structure 1000 (as will be described below), the external valve opening may be positioned in a desired position.

FIG. 31 illustrates an embodiment of an inflation device 1043 for inflating inflatable structures used in packaging. For example, the inflation device 1043 may be used to inflate the inflatable structure 1000 illustrated in FIG. 28. However, the inflation device 1043 may be configured and employed to inflate various other embodiments of inflatable structures. The inflation device 1043 may comprise a holder for holding at least one inflatable structure. For example, in the embodiment illustrated in FIG. 31, the holder comprises a mechanical registration device 1040 configured to engage a locator aperture defined in the inflatable structure. For example, the mechanical registration device 1040, which may comprise a post, pin, or other protrusion, may be configured to engage the locator aperture 1016 defined in the inflatable structure 1000 illustrated in FIG. 28. In other embodiments, clips or other holders may be employed to hold inflatable structures.

The inflation device 1043 additionally includes a source of pressurized air 1045 for inflating inflatable structures through a valve in the inflatable structure (e.g., through the one-way valve 1014 in the inflatable structure 1000). The source of pressurized air 1045 may comprise a motor and a fan in some embodiments. The source of pressurized air 1045 may be controlled by a controller 1048, which may be embodied as a printed circuit board in some embodiments. Further, power may be supplied by a power cord 1050, as illustrated, but a battery may be employed to power the controller 1048 and source of pressurized air 1045 in other embodiments.

The inflation device 1043 may further comprise a clamping mechanism 1077 configured to engage inflatable structures. As illustrated in FIG. 31, the clamping mechanism 1077 may comprise a hinge 1079 configured to provide for movement of the source of pressurized air 1045 between a loading position and an inflation position. In the illustrated embodiment, the source of pressurized air 1045 and the controller 1048 may comprise portions of a moveable member 1052. The hinge 1079 may hingedly couple the moveable member 1052 to a base member 1054. The hinge 1079 may comprise a cam surface, spring, or other mechanism configured to hold the moveable member 1052 in the loading position. Accordingly, loading of inflatable structures onto the mechanical registration device 1040 may be simplified.

The base member 1054 may comprise the above-described mechanical registration device 1040 as well as one or more alignment tabs 1056 configured to align an inflatable structure with respect to an outlet 1046 of the source of pressurized air 1045, as will be described below. The base member 1052 may be configured to mount to a mounting surface 1058 such as a vertical surface (e.g., a wall), a horizontal surface (e.g., a table), or other surface oriented in another direction. Fasteners 1060 may be employed to couple the base member 1054 to the mounting surface 1058 in some embodiments.

The clamping mechanism 1077 may further comprise a biasing mechanism configured to apply pressure to the inflatable structures during inflation. For example, as illustrated in FIG. 31, the clamping mechanism 1077 may comprise first 1062*a* and second 1062*b* magnetic members. The magnetic members 1062*a*, 1062*b* may both comprise magnets, or one of the magnetic members may comprise a magnet and the other magnetic member may comprise a piece of metal or other material attracted to magnets. The first magnetic member 1062*a* may be attached to the moveable member 1052 and the second magnetic member 1062*b* may be attached to the base member 1054. Accordingly, when the moveable member 1052 is pivoted to the inflation position, the magnetic members 1062*a*, 1062*b* may attract one other such that the moveable member is forced toward the base member 1054.

Figure 32:
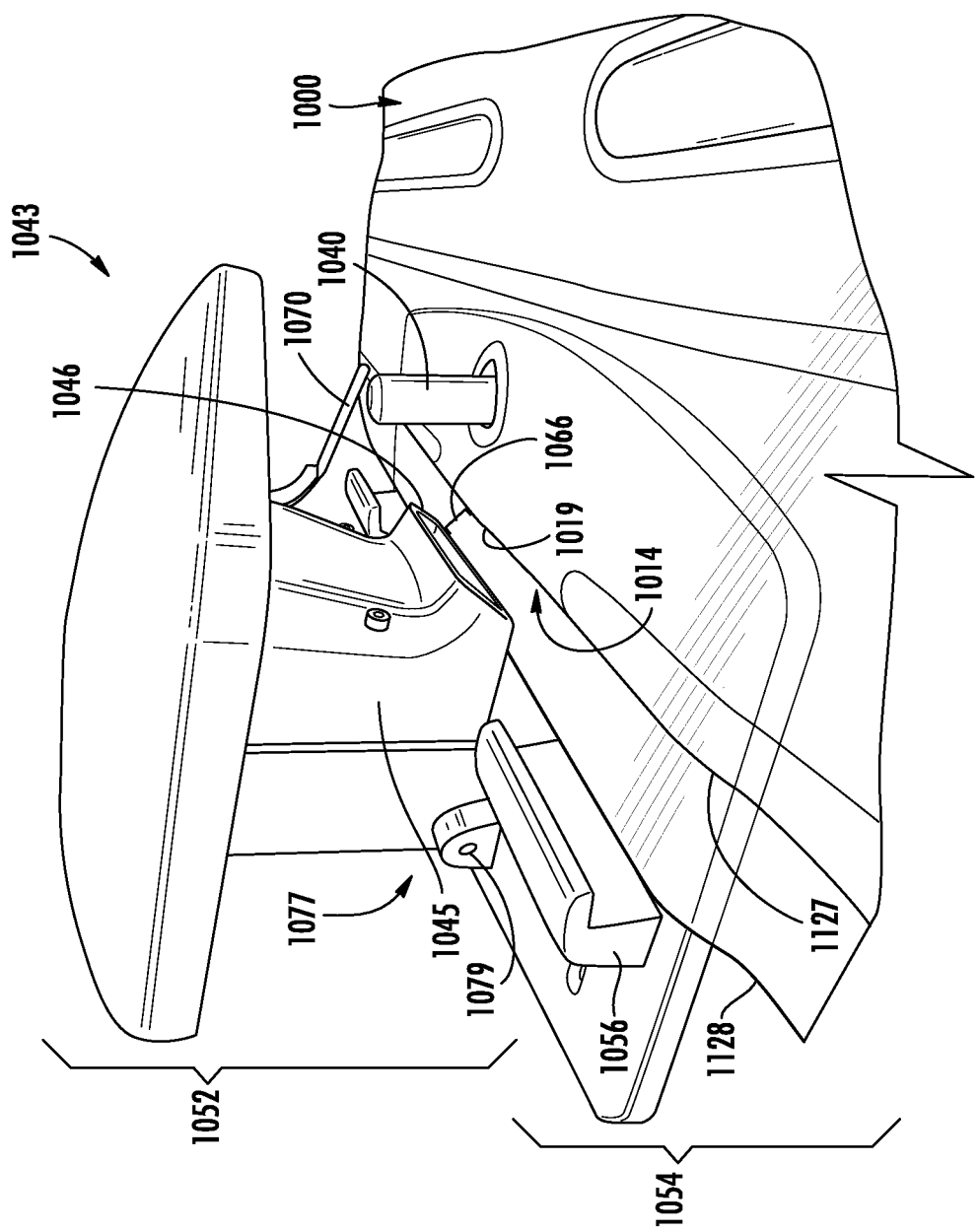
FIG. 32 illustrates a side view of the inflation device of FIG. 31 with the inflation device holding the inflatable structure of FIG. 28 in an inflation position.

Thus, as illustrated in FIG. 32, when one or more inflatable structures are attached to the mechanical registration device 1040, and the inflation device 1043 is configured to the inflation position by pivoting the moveable member 1052 toward the base member 1054, the magnetic members 1062*a*, 1062*b* will attract one another such that the moveable member and the base member apply pressure to the inflatable structure(s) by clamping the inflatable structure(s) therebetween. In some embodiments the biasing mechanism 1077 may be configured to apply pressure to an edge portion of the inflatable structure. For example, in FIGS. 32-35, the inflation device 1043 is illustrated inflating the inflatable structure 1000 of FIG. 28. Accordingly, the inflation device 1043 may clamp the above-described edge portion 1128 of the inflatable structure 1000. By applying pressure to the edge portion 1128 of the inflatable structure 1000, the inflation device 1043 may hold the one-way valve 1014 so as bring about more consistent inflation (e.g., in terms of rate of inflation) of the inflatable structure as compared to embodiments wherein the one-way valve is allowed a greater degree of freedom.

As previously mentioned, the inflation device 1043 may include one or more alignment tabs 1056 configured to align an inflatable structure with respect to the outlet 1046 of the source of pressurized air 1045. In this regard, as illustrated in FIG. 32, the mechanical registration device 1040 may center the inflatable structure 1000 with respect to the outlet 1046 of the inflation device 1043, and the alignment tabs 1056 may restrain the inflatable structure from rotating about the mechanical registration device 1040. Accordingly, as illustrated in FIGS. 32 and 33, the inflation device 1043 may align the inflatable structure 1000 in the inflation position such that the outlet 1046 of the inflation device aligns with the one-way valve 1014. Thereby, air may be directed though an inlet 1064 of the source of pressurized air 1045, through the outlet 1046, and into the external valve opening 1019 of the one-way valve 1014 to inflate the inflatable structure 1000.

As illustrated in FIG. 32, the mechanical registration device 1040 may be configured to hold an inflatable structure at a position such that insertion does not occur between the outlet 1046 of the source of pressurized air 1045 and the valve of the inflatable structure during inflation. Instead, as illustrated, the mechanical registration device 1040 positions the inflatable structure 1000 such that there is a space 1066 defined between the outlet 1046 of the source of pressurized air 1045 and the external valve opening 1019 defined by the one-way valve 1014.

As previously described, the outlet 1046 of the source of pressurized air 1045 may contact the inflatable structure 1000 in some embodiments. For example, as illustrated, the outlet 1046 may apply pressure to the edge portion 1128 of the inflatable structure 1000 due to the attraction of the magnetic members 1062a, 1062b, which may contribute to relatively more consistent inflation. However, the outlet 1046 may still be spaced from at least a portion of the external valve opening 1019 during inflation. For example, the outlet may be spaced from the second edge portion 1127 defining the external valve opening 1019, is illustrated in FIG. 32. In some embodiments, the space 1066 defined between the outlet 1046 of the source of pressurized air 1045 and the external valve opening 1019 may be in the range of one-quarter inch to three-eighths inches. However, the space 1066 may vary depending on the embodiment of inflatable structure 1000 and source of pressurized air 1045 employed, among other factors.

Accordingly, a fluid-tight coupling is not required to inflate the inflatable structure 1000. In this regard, as noted above, insertion need not occur between the outlet 1046 of the source of pressurized air 1045 and the one-way valve 1014 during inflation. In particular, as illustrated, the outlet 1046 of the source of pressurized air 1045 does not insert into the one-way valve 1014, and the one-way valve does not insert into the outlet of the source of pressurized air in one embodiment. Thus, inflation of the inflatable structure 1000 may occur in a simplified manner by not relying on insertion, which may require tight tolerances in terms of the dimensions of the inflatable structure. Further, tight tolerances in terms of the positioning between the outlet of the source of pressurized air and the one-way valve may not be required.

However, insertion between the outlet 1046 of the source of pressurized air 1045 and the one-way valve 1014 may occur during inflation in alternate embodiments. For example, the outlet 1046 of the source of pressurized air may include a nozzle configured to insert into the one-way valve 1014. The nozzle may be configured to inflate inflatable structures without insertion into the one-way valve 1014 under normal circumstances, but the nozzle may be inserted into the one-way valve under other circumstances, for example, when the inflatable structure is not inflating properly without insertion or a different embodiment of an inflatable structure requiring insertion is employed. In an alternate embodiment, the nozzle may be removably attachable to the outlet 1046 of the source of pressurized air 1045. Thereby, the inflatable structures may be inflated without insertion under normal circumstances. However, when difficulty in inflating the inflatable structure is experienced, or a different embodiment of an inflatable structure requiring insertion is employed, the nozzle may be attached to inflate the inflatable structures via insertion.

The inflation device 1043 may further comprise a switch 1068 (see, e.g., FIG. 31) configured to shut off the source of pressurized air 1045 when the inflatable structure 1000 is filled with a desired amount of air. The switch 1068 may comprise a pivotable arm 1070 configured to contact the inflatable structure 1000 as the inflatable structure inflates and actuate the switch to shut off the source of pressurized air 1045 when the inflatable structure is filled with the desired amount of air. In this regard, as illustrated in FIG. 32, the pivotable arm 1070 may extend to a position over the inflatable structure 1000 such that when the inflatable structure inflates, the switch 1068 is actuated. However, as illustrated in FIG. 31, the pivotable arm 1070 may extend from the moveable member 1052. Accordingly, when the moveable member 1052 is pivoted to the loading position, the pivotable arm 1070 may move to a position whereby loading of the inflatable structures may occur without the user having to separately move or avoid the pivotable arm. Accordingly, loading of the inflatable structures may occur in a simplified manner.

Methods for inflating inflatable structures used in packaging are also provided herein. In this regard, FIG. 34 illustrates steps included in an example method of inflating inflatable structures. The method is illustrated as being conducted in conjunction with the inflatable structure 1000 illustrated in FIG. 28. However, other embodiments of inflatable structures may be inflated in other embodiments. The method may include loading the inflatable structures 1000 onto the holder, as illustrated at operation 1200. In particular, holding the inflatable structure 1000 may comprise engaging the mechanical registration device 1040 with the locator aperture(s) 1016 defined in one or more inflatable structures. In some embodiments the inflatable structures 1000 may be held together by a removable clamp, or a tie extending through the locator aperture 1016. Thereby, a plurality of the inflatable structures 1000 may be loaded onto the mechanical registration device 1040 at one time, and then the tie or clamp may be removed in order to load two or more of the inflatable structures in an expedited manner.

As illustrated at operation 1202, the method may further comprise pivoting the moveable member 1052 from the loading position to the inflation position. As further illustrated at operation 1202, the method may include holding the inflatable structure 1000 such that the outlet 1046 of the source of pressurized air 1045 is spaced from at least a portion of the external valve opening of the inflatable structure (see, e.g., the external valve opening 1019 of the one-way valve 1014) and insertion does not occur between the outlet of the source of pressurized air and the valve during inflation. As additionally illustrated at operation 1202, the method may include engaging the inflatable structure 1000 with a clamping mechanism 1077. As previously described, engaging the inflatable structure 1000 with the clamping mechanism 1077 may comprise applying pressure to an edge portion (see, e.g., the edge portion 1128) of the inflatable structure. For example, a biasing mechanism such as the magnetic members 1062a, 1062b, may operate in conjunction with the hinge 1079 to apply pressure to the edge portion 1128 of the inflatable structure 1000 to bring about relatively greater consistency in inflating the inflatable structures. As additionally illustrated in operation 1202, the method may include aligning the inflatable structure with respect to the outlet 1046 of the source of pressurized air 1045 with one or more alignment tabs 1056. As previously described, the alignment tabs 1056 may restrain rotation of the inflatable structure 1000 about the mechanical registration device 1040.

The method further includes filling the inflatable structure 1000 with a desired amount of the air from the source of pressurized air 1045, as illustrated at operation 1204. In this regard, the method may include actuating a switch (see, e.g., switch 1068) configured to shut off the source of pressurized air 1045 when the inflatable structure 1000 is filled with a desired amount of air. For example, actuating the switch 1068 may comprise contacting the inflatable structure 1000 with the pivotable arm 1070 and actuating the switch via the pivotable arm when the inflatable structure is filled with the desired amount of air. As illustrated, when the inflatable structure 1000 inflates, the pivotable arm 1070 may be displaced from an initial position 1070a to a displaced position 1070b, which actuates the switch 1068, and directly (via mechanical or electrical interaction) turns off the source of pressurized air 1045 or signals the controller 1048 to shut off the source of pressurized air. The source of pressurized air 1045 may be shut off immediately or after a predetermined time. For example, the controller 1048 or a separate controller (e.g., a microcontroller or integrated circuit) may delay the shutoff for a predetermined period of time (e.g., one to ten seconds). Accordingly, after the inflatable structure 1000 reaches a desired dimension, corresponding to a desired quantity of air, the source of pressurized air 1045 may be turned off, and a delay may be employed to account for changes in shape of inflatable structures during inflation and/or ensure full inflation.

As illustrated at operation 1206, the inflated inflatable structure 1000 may be removed from the inflation device 1043 by pulling the inflatable structure off of the mechanical registration device 1040. During this operation, the hinge 1079 may allow the moveable member 1052 to pivot slightly such that the inflated inflatable structure 1000 may be removed with relatively little resistance. After the inflated inflatable structure 1000 is removed, the pivotable arm 1070 may return from the displaced position 1070b to the initial position 1070a. In this regard, the pivotable arm 1070 may be biased, for example by a spring or gravity acting on the mass of the pivotable arm, to the initial position 1070a. Accordingly, the switch 1068 may return to an initial unactuated position, and the source of pressurized air 1045 may automatically turn on again to inflate the next inflatable structures held by the mechanical registration device 1040. Thus, the method may also including unactuating the switch when the inflatable structure 1000 (i.e., a first inflatable structure 1000a) is removed and automatically inflating a second inflatable structure 1000b.

An additional method of inflating inflatable structures used in packaging is illustrated in FIG. 34. As illustrated at operation 1204, the method may include holding a first inflatable structure 1000a at a position such that the outlet 1046 of the source of pressurized air 1045 is proximate the valve (e.g., the one-way valve 1014) of the first inflatable structure. As further illustrated at operation 1204, the method may include filling the first inflatable structure 1000a with a desired amount of the air from the source of pressurized air 1045 while preventing inflation of a second inflatable structure 1000b by blocking the air directed from the outlet 1046 from entering the second inflatable structure with an edge portion 1128 of the first inflatable structure. In this regard, the edge portion 1128 of the first inflatable structure 1000a may block the air from entering the one-way 1014 in the second inflatable structure 1000b. Further, the biasing mechanism (e.g., the magnetic members 1062a, 1062b) may assist in blocking air from reaching the one-way valve 1014 of the second inflatable structure 1000b by applying pressure to the inflatable structures 1000, thus clamping closed the one-way valve of the second inflatable structure. As illustrated at operation 1206, the method may further comprise removing the first inflatable structure 1000a so as to unblock the second inflatable structure 1000b. Thereby, the method may further include automatically inflating the second inflatable structure 1000b, as discussed above.

Accordingly, inflation of multiple inflatable structures may occur in a relatively simplified and rapid manner. By inflating the inflatable structures in accordance with the above-described methods, labor savings may occur. In this regard, the user need not successively insert a needle or other inflation device into each of the inflatable structures in order to inflate multiple inflatable structures. Instead, the user mounts the inflatable structures on the holder (e.g., on the mechanical registration device), and then the inflation device automatically inflates an inflatable structure. Further, the inflation device automatically inflates each successive inflatable structure upon the user removing an inflated inflatable structure. Accordingly, while the user makes use of an inflated inflatable structure (e.g., to cushion goods in a package), the inflation device automatically inflates the next inflatable structure. Thus, the user may experience little or no downtime waiting for inflatable structures to inflate. Accordingly user productivity may be improved.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An inflation device for inflating inflatable structures used in packaging, comprising:

a holder for holding at least one inflatable structure; and a source of pressurized air for inflating the inflatable structure through a valve in the inflatable structure, the source of pressurized air defining an outlet from which a flow of air exits the inflation device, wherein the holder is configured to hold the inflatable structure at a position such that the outlet of the source of pressurized air is spaced a distance from the inflatable structure during inflation and such that the air flow exiting the inflation device from the outlet is directed toward the valve of the inflatable structure.

2. The inflation device of claim 1, wherein the holder comprises a mechanical registration device configured to engage a locator aperture defined in the inflatable structure.

3. The inflation device of claim 2, wherein the mechanical registration device is configured such that, when the mechanical registration device engages a locator aperture in the inflatable structure, the valve in the inflatable structure is proximate to the outlet of the source of pressurized air.

4. The inflation device of claim 1, further comprising a base member configured to be mounted to a vertical surface and thereby secure the inflation device to a vertical surface.

5. The inflation device of claim 1, further comprising a clamping mechanism configured to engage the inflatable structure.

6. The inflation device of claim 1, further comprising one or more alignment tabs configured to align the inflatable structure with respect to the outlet of the source of pressurized air.

7. The inflation device of claim 1, further comprising a switch configured to shut off the source of pressurized air when the inflatable structure is filled with a desired amount of air.

8. A method of inflating inflatable structures used in packaging, comprising:

providing an inflation device having a source of pressurized air and defining an outlet from which a flow of air exits the inflation device;

holding an inflatable structure at a distance from the outlet of the source of pressurized air during inflation, with the inflatable structure positioned such that the air flow exiting the inflation device from the outlet is directed toward a valve of the inflatable structure; and filling the inflatable structure with a desired amount of the air from the source of pressurized air.

9. The method of inflating inflatable structures of claim 8, further comprising actuating a switch configured to shut off the source of pressurized air when the inflatable structure is filled with a desired amount of air.

10. The method of inflating inflatable structures of claim 8, wherein holding the inflatable structure comprises engaging a mechanical registration device with a locator aperture defined in the inflatable structure.

11. The method of inflating inflatable structures of claim 8, further comprising engaging the inflatable structure with a clamping mechanism.

12. The method of claim 11, further comprising aligning the inflatable structure with respect to the outlet of the source of pressurized air with one or more alignment tabs.

13. The method of claim 9, further comprising unactuating the switch when the inflatable structure that is inflated is removed; and automatically inflating a second inflatable structure.

* * * * *